(12) United States Patent
Foote et al.

(10) Patent No.: US 7,253,766 B2
(45) Date of Patent: Aug. 7, 2007

(54) THREE-DIMENSIONAL SURFACE/CONTOUR PROCESSING BASED ON ELECTROMAGNETIC RADIATION INTERROGATION

(75) Inventors: Harlan P. Foote, Richland, WA (US); Thomas E. Hall, Kennewick, WA (US); Douglas L. McMakin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 339 days.

(21) Appl. No.: 10/950,244

(22) Filed: Sep. 24, 2004

(65) Prior Publication Data

US 2006/0066469 A1  Mar. 30, 2006

(51) Int. Cl.
*G01S 13/89* (2006.01)

(52) U.S. Cl. .......................................... 342/22; 342/179

(58) Field of Classification Search ................. 342/22, 342/179
See application file for complete search history.

(56) References Cited

U.S. PATENT DOCUMENTS

| | | | |
|---|---|---|---|
| 3,689,772 A | 9/1972 | George et al. |
| 3,713,156 A | 1/1973 | Pothier |
| 3,755,810 A | 8/1973 | Latham et al. |
| 3,990,436 A | 11/1976 | Ott |
| 4,635,367 A | 1/1987 | Vigede |
| 4,705,401 A | 11/1987 | Addleman et al. |
| 4,829,303 A | 5/1989 | Zebker et al. |
| 4,910,523 A | 3/1990 | Huguenin et al. |
| 4,916,634 A | 4/1990 | Collins et al. |
| 5,047,783 A | 9/1991 | Hugenin |
| 5,060,393 A | 10/1991 | Silverman et al. |
| 5,073,782 A | 12/1991 | Hugenin et al. |
| 5,081,456 A | 1/1992 | Michiguchi et al. |
| 5,142,255 A | 8/1992 | Chang et al. |
| 5,227,797 A | 7/1993 | Murphy |
| 5,227,800 A | 7/1993 | Huguenin et al. |
| 5,274,714 A | 12/1993 | Hutcheson et al. |
| 5,367,552 A | 11/1994 | Peschmann |
| 5,414,803 A | 5/1995 | Malzbender |
| 5,455,587 A | 10/1995 | Schneider |

(Continued)

FOREIGN PATENT DOCUMENTS

EP  0636898  2/1995

(Continued)

OTHER PUBLICATIONS

Xiao et al. "A Topological Approach for Segmenting Human Body Shape". 12th International Conference on Image Analysis and Processing. Sep. 17-19. pp. 82-87.*

(Continued)

*Primary Examiner*—Thomas H. Tarcza
*Assistant Examiner*—Matthew M. Barker
(74) *Attorney, Agent, or Firm*—Klarquist Sparkman, LLP

(57) ABSTRACT

One embodiment of the present invention includes scanning a target with electromagnetic radiation including one or more frequencies in a range of about 200 MHz to about 1 THz; establishing a point cloud representation of the surface of the target from the scan; and performing one or more curve-fitting operations as a function of at least a portion of the points of the point cloud representation to represent at least a portion of the surface of the target.

38 Claims, 25 Drawing Sheets

U.S. PATENT DOCUMENTS

| | | | |
|---|---|---|---|
| 5,455,590 | A | 10/1995 | Collins et al. |
| 5,557,283 | A * | 9/1996 | Sheen et al. ............... 342/179 |
| 5,600,303 | A | 2/1997 | Husseiny et al. |
| 5,680,528 | A | 10/1997 | Korszun |
| 5,720,708 | A | 2/1998 | Lu |
| 5,740,800 | A | 4/1998 | Hendrickson et al. |
| 5,747,822 | A | 5/1998 | Sinclair et al. |
| 5,796,363 | A | 8/1998 | Mast |
| 5,833,599 | A | 11/1998 | Schrier et al. |
| 5,835,054 | A | 11/1998 | Warhus et al. |
| 5,857,030 | A | 1/1999 | Gaborski et al. |
| 5,859,609 | A * | 1/1999 | Sheen et al. ............... 342/179 |
| 5,956,525 | A | 9/1999 | Minsky |
| 5,963,667 | A | 10/1999 | Hashimoto et al. |
| 5,995,014 | A | 11/1999 | DiMaria |
| 6,014,099 | A * | 1/2000 | Bennett et al. ........... 342/25 F |
| 6,018,562 | A | 1/2000 | Wilson |
| 6,028,547 | A * | 2/2000 | Dory ........................... 342/22 |
| 6,038,337 | A | 3/2000 | Lawrence et al. |
| 6,057,761 | A | 5/2000 | Yukl |
| 6,075,455 | A | 6/2000 | DiMaria et al. |
| 6,081,750 | A | 6/2000 | Hoffberg et al. |
| 6,088,295 | A * | 7/2000 | Altes .......................... 367/103 |
| 6,144,388 | A | 11/2000 | Bornstein |
| 6,253,164 | B1 * | 6/2001 | Rohm et al. .................... 703/2 |
| 6,324,532 | B1 | 11/2001 | Spence et al. |
| 6,359,582 | B1 | 3/2002 | MacAleese et al. |
| 6,373,963 | B1 * | 4/2002 | Demers et al. ............. 382/108 |
| 6,418,424 | B1 | 7/2002 | Hoffberg et al. |
| 6,420,698 | B1 * | 7/2002 | Dimsdale .................... 250/234 |
| 6,429,802 | B1 * | 8/2002 | Roberts ....................... 342/22 |
| 6,441,734 | B1 | 8/2002 | Gutta et al. |
| 6,480,141 | B1 | 11/2002 | Toth et al. |
| 6,507,309 | B2 * | 1/2003 | McMakin et al. ............ 342/22 |
| 6,700,526 | B2 | 3/2004 | Witten |
| 6,703,964 | B2 * | 3/2004 | McMakin et al. ............ 342/22 |
| 6,777,684 | B1 | 8/2004 | Volkov et al. |
| 6,876,322 | B2 | 4/2005 | Keller |
| 6,927,691 | B2 | 8/2005 | Yukl |
| 6,940,446 | B2 * | 9/2005 | Cist ........................... 342/22 |
| 7,034,746 | B1 | 4/2006 | McMakin et al. |
| 7,124,044 | B2 * | 10/2006 | Witten ......................... 702/77 |
| 2002/0150304 | A1 | 10/2002 | Ockman |
| 2003/0034444 | A1 | 2/2003 | Chadwick et al. |
| 2003/0053698 | A1 | 3/2003 | Ferguson |
| 2003/0076254 | A1 | 4/2003 | Witten |
| 2003/0086525 | A1 | 5/2003 | Rhee et al. |
| 2003/0117310 | A1 | 6/2003 | Kikuchi et al. |
| 2003/0125622 | A1 * | 7/2003 | Schweikard et al. ........ 600/437 |
| 2003/0163042 | A1 | 8/2003 | Salmon |
| 2003/0179126 | A1 | 9/2003 | Jablonski et al. |
| 2004/0090359 | A1 * | 5/2004 | McMakin et al. ............ 342/22 |
| 2004/0140924 | A1 | 7/2004 | Keller et al. |
| 2005/0078028 | A1 * | 4/2005 | Cist ........................... 342/22 |
| 2005/0122249 | A1 * | 6/2005 | Grudkowski et al. ......... 342/22 |
| 2005/0122257 | A1 * | 6/2005 | Rowe et al. ................. 342/179 |
| 2005/0122258 | A1 * | 6/2005 | Blasing et al. .............. 342/179 |
| 2005/0230604 | A1 * | 10/2005 | Rowe et al. ................. 250/221 |
| 2005/0231415 | A1 * | 10/2005 | Fleisher et al. ............... 342/22 |
| 2005/0231416 | A1 * | 10/2005 | Rowe et al. ................... 342/22 |
| 2005/0231417 | A1 * | 10/2005 | Fleisher et al. ............... 342/22 |
| 2005/0231421 | A1 * | 10/2005 | Fleisher et al. ............. 342/179 |
| 2005/0232459 | A1 * | 10/2005 | Rowe et al. ................. 382/100 |
| 2005/0232487 | A1 * | 10/2005 | Fleisher ...................... 382/181 |
| 2005/0234383 | A1 | 10/2005 | Dougal |
| 2006/0066469 | A1 | 3/2006 | Foote et al. |

FOREIGN PATENT DOCUMENTS

| | | |
|---|---|---|
| GB | 2034554 | 6/1980 |
| GB | 2083715 | 3/1982 |
| WO | WO 02/17231 | 2/2002 |
| WO | WO 05/050160 | 6/2005 |

OTHER PUBLICATIONS

Abbott, "Personal Surveillance, System," *IBM Technical Disclosure Bulletin*, 12:1119-1120 (Dec. 1969).

Ahles, "The Caesar Project," print-out of website at URL thunder.temple.edu/~mridenou/pe204/bodyAnthroCaesar.html, Philadelphia Inquirer (Feb. 11, 1999).

Aoki et al., "Diagnosis of Under-Snow Radar Images by Three Dimensional Displaying Technique in Holographic Imaging Radar," *Proc. Of IGARSS '87 Symposium*, pp. 571-576 (May 18-21, 1974).

Boyer et al., "Reconstruction of Ultrasonic Images by Backward Propagation," Ch. 18, pp. 333-349.

Collins, "Error Analysis in Scanned Holography," Thesis, Oregon State University (1970).

Cookson, "Body scanners to shape our shopping," London (Dated at least as early as Dec. 1, 2000).

Cyberware, "Body Measurement/Garment Fitting Software," print-out of website at URL www.cyberware.com/pressRelease/digisize_PR1.html, Monterey, CA (Aug. 9, 1999).

Cyberware, "Cyberware Extracts Tailor Measurements from 3D Scan Data," print-out of website at URL www.Cyberware.com/pressReleases/arn.html, Monterey, CA (Aug. 1, 1997).

Cyberware, "Cyberware Whole Body Scanning," print-out of website at URL www.cyberware.com/products/WholeBody.html (1999).

Cyberware, "Laser Sizes Up Your Body, Fits Your Clothing," print-out of website at URL www.cyberware.com/pressRelease/digisize_PR2.html, Monterey, CA (Aug. 9, 1999).

Cyberware, "The World's First Whole Body Scanners Bring True Human Forms to Computer Graphics," print-out of website at URL www.cyberware.com/pressReleases/firstWB.html, Monterey, CA (May 11, 1995).

Farhat, "High Resolution Microwave Holography and the Imaging of Remote Moving Objects," *Optical Engineering* 14:499-505 (1975).

Fujita et al., "Polarimetric Calibration of the SIR-C C-Band Channel Using Active Radar Calibrators and Polarization Selective Dihedrals," IEEE Transactions on Geoscience and Remote Sensing,36:1872-1878 (1998).

Hildebrand et al., "An Introduction to Acousitcal Holography," pp. 20-21 (1974).

Keller et al., "Privacy Algorithm for Cylindrical Holographic Weapons Surveillance System," IEEE Aerospace and Electronic Systems Magazine, 15:17-24 (2000).

McMakin et al., "Cylindrical Holographic Imaging System Privacy Algorthim Final Report," Pacific Northwest National Laboratory, Richland, WA (1999).

McMakin et al., "Detection of Concealed Weapons and Explosives on Personnel Using a Wide-band Holographic Millimeter-wave Imaging System," American Defense Preparedness Assocation Security Technology Division Joint Security Technology Symposium, Williamsburg, Va., (1996).

McMakin et al., "Millimeter-wave high-resolution holographic surveillance systems," SPIE 2092:525-535 (1993).

McMakin et al., "Wideband, millimeter-wave, holographic weapons surveillance system," Proceedings of the SPEE—EUROPTO European Symposium on Optics for Environmental and Public Safety, 2511:131-141 (1995).

Michelson et al., "A Calibration Algorithm for Circular Polarimetric Radars," Journal of Electromagnetic Waves and Applications, 11:659-674 (1997).

Osumi et al., "Detection of Buried Objects," *IEE Proceedings*, 135:330-342 (Aug. 1988).

SAE International, print-out of website at URL www.sae.org/technicalcommittees (Feb. 2000).

Sheen et al., "Combined illumination cylindrical millimeter-wave imaging technique for concealed weapon detection," *SPIE Proceedings Publication*, (Apr. 26, 2000).

Sheen et al., "Concealed explosive detection on personnel using a wideband holographic millimeter-wave imaging system," Proceedings of the SPIE—Aerosense Aerospace/Defense Sensing and Controls, 2755:503-513 (1996).

Sheen et al., "Cylindrical millimeter-wave imaging technique for concealed weapon detection," Proceedings of the SPIE—26th AIPR Workshop: Exploiting New Image Sources and Sensors, 3240:242-250 (Mar. 1998).

Sheen et al., "Three-Dimensional Millimeter-Wave Imaging for Concealed Weapon Detection," IEEE Transactions on Microwave Theory and Techniques, 49: 1581-1592 (2001).

Sinclair et al., "Passive millimetre wave imaging in security scanning," Proc. SPIE, 4032:40-45 (2000).

Soumekh, "Fournier Array Imaging," Published by PTR Prentice Hall, Englewood Cliffs, NJ, pp. 339-348 (1994).

Tricoles et al., "Microwave Holography: Applications and Techniques," *Proceedings of the IEEE*, 65:108-121 (Jan. 1977).

Yngvesson et al., "Endfire Tapered Slot Antennas on Dielectric Substrates," *IEEE Trans on Antennas and Propagation*, 33:1392-1400 (Dec. 1985).

Yueh et al., "Calibration of polarimetric radars using in-scene reflectors," Journal of Electromagnetic Waves and Applications, 4:27-48 (1990).

Written Opinion of the International Searching Authority, date of mailing Jan. 11, 2007, International application No. PCT/US05/31297.

Boyer et al., "Reconstruction of Ultrasonic Images by Backward Propagation," Ch. 18, pp. 333-349. (1970).

* cited by examiner

Surface synthesis (point cloud) and surface definitions files (mesh & surface)

US 7,253,766 B2

THREE-DIMENSIONAL SURFACE/CONTOUR PROCESSING BASED ON ELECTROMAGNETIC RADIATION INTERROGATION

CROSS-REFERENCE TO RELATED APPLICATIONS

The present application is related to commonly owned U.S. patent application Ser. No. 10/697,965 filed 30 Oct. 2003, Ser. No. 10/697,848 filed 30 Oct. 2003 (U.S. Patent Publication No. U.S. 2004/0090359 A1), Ser. No. 10/607,552 filed 26 Jun. 2003, Ser. No. 10/301,552 filed 21 Nov. 2002 (now U.S. Pat. No. 6,703,964 B2), and Ser. No. 09/810,054 filed 16 Mar. 2001 (now U.S. Pat. No. 6,507,309 B2). The above-indicated patents and patent applications are each hereby incorporated by reference each in its entirety.

FIELD

The present invention relates to data processing of information, and more particularly, but not exclusively, relates to developing topological surface and/or contour information from electromagnetic radiation interrogations in the 200 MegaHertz (MHz) to 1 TeraHertz (THz) range.

It is often desirable to nonintrusively interrogate an object for dimensional information with less object handling, reduced interrogation time, and/or greater resolution than existing schemes. Alternatively or additionally, it can be desirable to determine the topography of an object's surface and/or a particular contour or sectional shape. Furthermore, in some instances, there is a desire to provide an image of an interrogated object. Various applications of this interrogation information include scanning to determine if access to a secure area should be given to a particular individual, automated mensuration for fitting clothing, prosthetic limb dimensioning/shaping, customization of vehicle seating arrangements, and/or automated object mating or matching, just to name a few. Thus, there is a demand for further contributions in this area of technology, including new ways to obtain dimensional, topographical, contour, image, and/or other information about an object/person.

SUMMARY

One embodiment of the present invention is a unique technique to process information. Other embodiments include unique systems, devices, methods, and apparatus to determine dimensional, surface, contour, image, and/or other information about an object through electromagnetic interrogation. Still other embodiments include unique ways to utilize such information—including, but not limited to, applications involving interrogation of a person as the target of interest. Further embodiments, forms, features, advantages, aspects, and benefits of the present invention shall become apparent from the detailed description and figures provided herewith.

DETAILED DESCRIPTION

Figure 1:
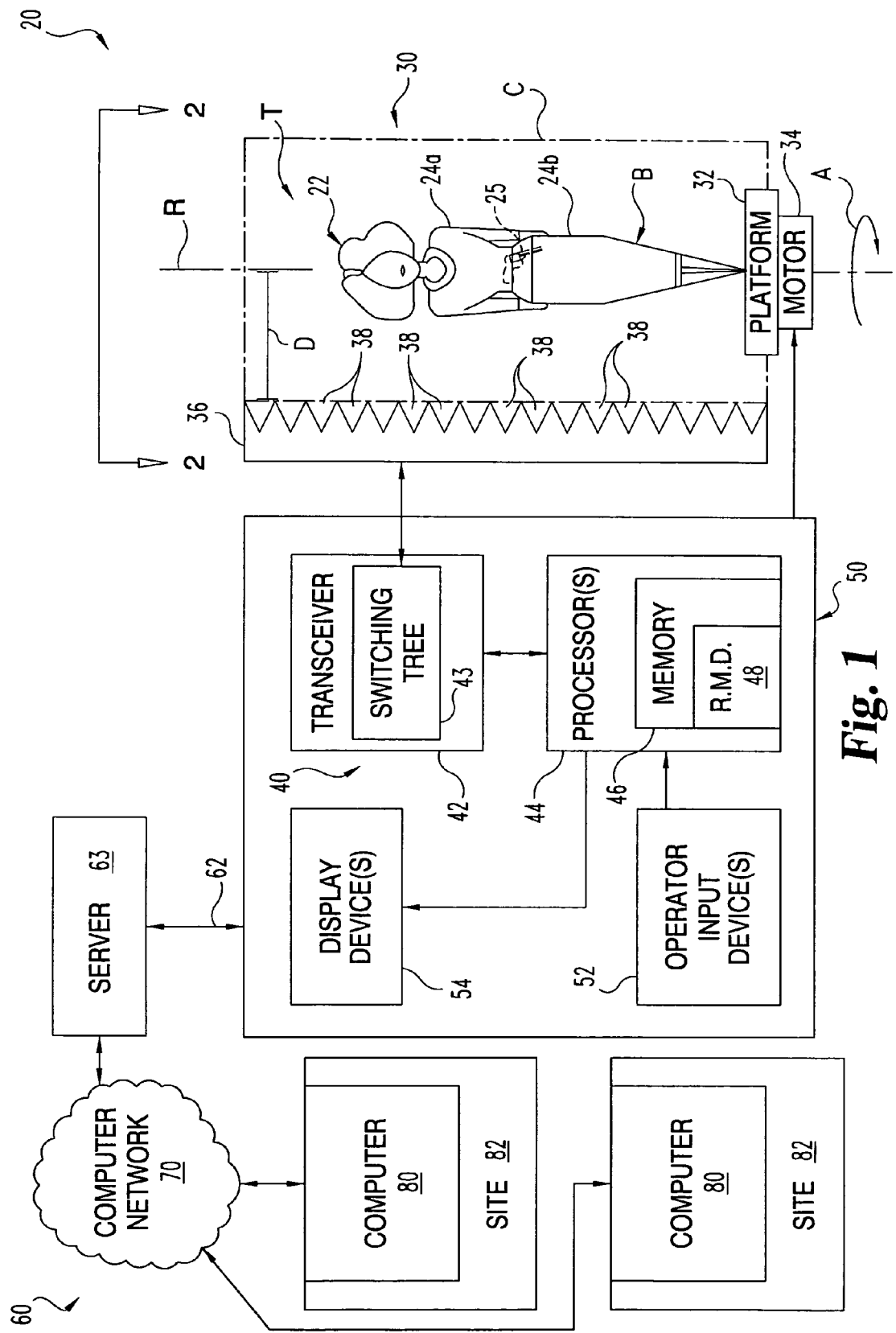
FIG. 1 is a partial, diagrammatic view of a security inspection system.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 illustrates security inspection system 20 of one embodiment of the present invention. In operation, system 20 interrogates an animate or inanimate object (or target T) by illuminating it with electromagnetic radiation in the 200 Megahertz (MHz) to 1 Terahertz (THz) frequency range and detecting the reflected radiation. Generally, the corresponding wavelengths range from several centimeters to a few micrometers. Certain natural and synthetic fibers are often transparent or semi-transparent to such frequencies/wavelengths, permitting the detection and/or imaging of surfaces positioned beneath such materials. When the subject of interrogation is a clothed individual, image information about portions of a person's body covered by clothing or garments can typically be obtained with system 20, as well as those portions that are not covered by clothing or garments. Further, image information relative to objects carried by a person beneath clothing can be provided with system 20 for metal and nonmetal object compositions commonly used for weapons and contraband.

As illustrated in FIG. 1, body B is in the form of person 22 presented for interrogation by system 20. Person 22 is portrayed in a typical manner, being at least partially covered by garments or clothing designated more specifically by reference numerals 24a and 24b. Person 22 is positioned in scanning/illumination portal 30 of system 20. Portal 30 is configured for use in determining body measurements for tailored clothing, for other mensuration purposes, for placement at a security checkpoint where it is desired to detect weapons/contraband, and/or different purposes. Portal 30 includes platform 32 connected to motor 34. Platform 32 is arranged to support person 22 or such other object desired to be examined with system 20. Motor 34 is arranged to selectively rotate platform 32 about rotational axis R while person 22 or another object is positioned thereon. For the orientation shown, axis R is approximately vertical, and person 22 is in a generally central position relative to axis R and platform 32. In one form, platform 32 can be comprised of a material, such as an organic thermoplastic or thermoset polymer, that permits interrogation in or beneath the soles of shoes where measurements or surface profiles may be desired and/or where weapons or contraband can sometimes be hidden.

Figure 2:
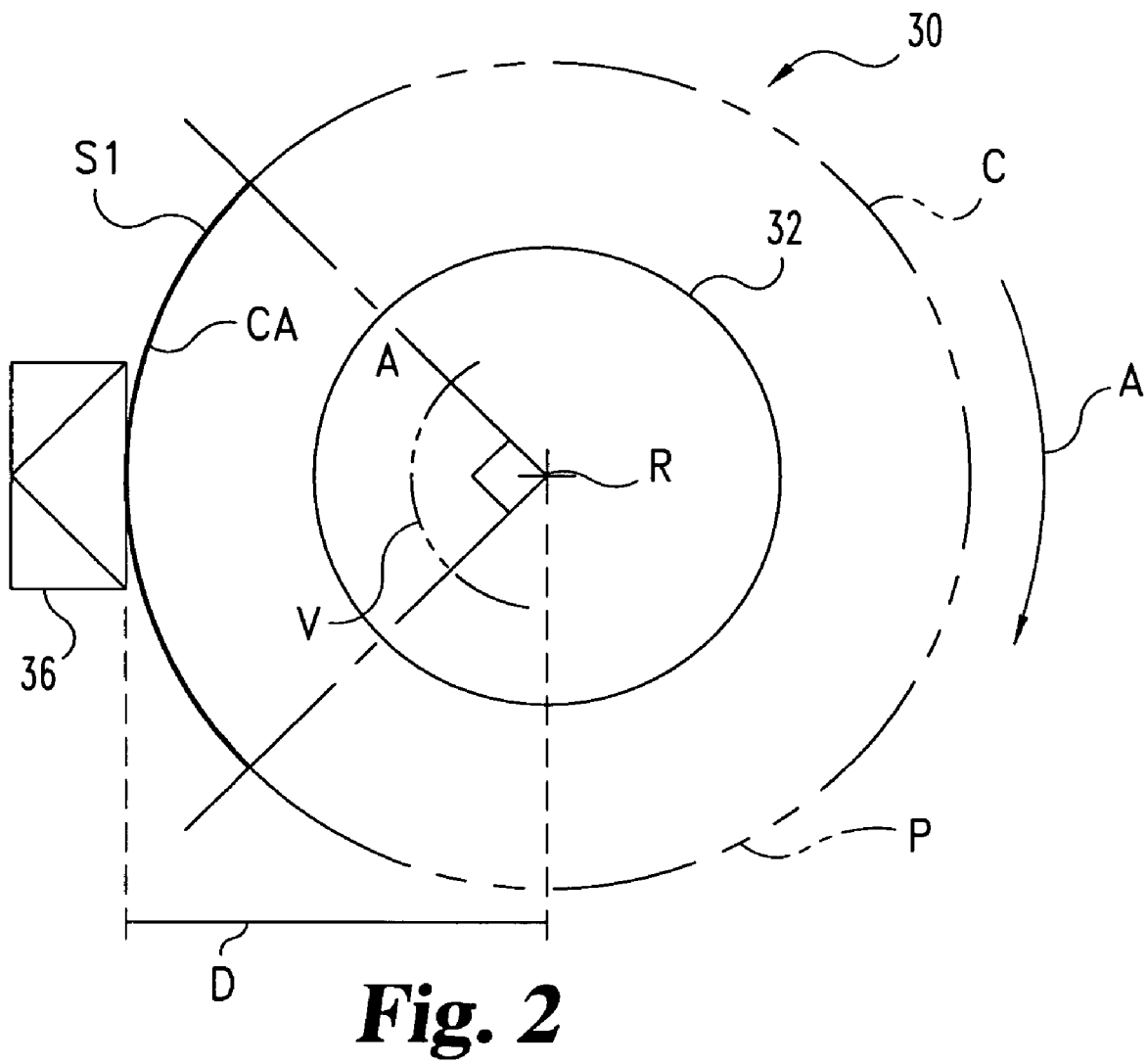
FIG. 2 is a partial, top view of the FIG. 1 system along the view line 2-2 shown in FIG. 1.

Portal 30 further includes multiple element-sensing array 36. Referring additionally to the partial top view of FIG. 2, the relationship of platform 32 to array 36 is further illustrated. Axis R is generally perpendicular to the view plane of FIG. 2 and is represented by crosshairs. As motor 34 causes platform 32 to rotate about axis R, array 36 circumscribes a generally circular pathway P about axis R. Circular pathway P corresponds to an imaginary cylinder C with radius D that corresponds to an interrogation region for portal 30. Radius D is the distance from axis R to array 36. In one preferred form, radius D is about 0.25 to about 3 meters. In a more preferred form, radius D is about 0.5 meters to 1.5 meters—corresponding to about a 1 meter to 3 meter diameter. Arrow A shown in FIGS. 1 and 2 represents the selective rotation of platform 32 about axis R.

Sensing array 36 includes a number of linearly arranged elements 38 only a few of which are schematically illustrated and specifically designated by reference numerals to preserve clarity. Elements 38 each operate to transmit or receive electromagnetic radiation within a selected bandwidth. Sensing array 36 is coupled to processing subsystem 40. Subsystem 40 includes transceiver 42 with switching tree 43 coupled to elements 38 of array 36. In one form, the position of array 36 relative to platform 32 is determined with one or more positional encoders (not shown) that are coupled to subsystem 40. In other forms, one or more different position tracking devices and/or positioning tracking techniques can be used.

Under the control of transceiver 42, individual elements 38 can be selectively activated with switching tree 43. Each element 38 is dedicated to transmission or reception. Elements 38 are arranged in two generally vertical columns arranged in a back-to-back relationship with one another. Elements 38 comprising one of the columns are dedicated to transmission and elements 38 comprising the other of the columns are dedicated to reception. The number of elements 38 in each column is in a range of about 32 to about 2000 elements and spans a vertical distance of about 2 to 2.5 meters along axis R; however, in other embodiments, a different vertical span and/or number of elements can be utilized. Transceiver 42 can control switching tree 43 to irradiate body B with only one element 38 of the transmitting column at a time and simultaneously receive with one or more elements 38 of the receiving column. Transceiver 42 includes logic to direct successive activation of each element 38 of the transmitting column and the corresponding one or more elements 38 of the receiving column to provide a scan of a portion of person 22 along a vertical direction with array 36. The corresponding "down range" or "time-of-flight" information can be used to provide positional data about a corresponding portion of person 22 under interrogation. Further information about such arrangements is provided in commonly owned U.S. Pat. No. 5,859,609, which is hereby incorporated by reference.

In one preferred embodiment, transceiver 42 and elements 38 of array 36 are of a form suitable to transmit and/or receive electromagnetic radiation selected from the range of about one Gigahertz to about one Terahertz (about 1 GHz to about 1 THz), which corresponds to a free space electromagnetic radiation wavelength range of about 0.3 meter (m) to about 300 micrometers ($\mu$m). In another preferred embodiment, an impulse transceiver arrangement is utilized that generates frequencies in a range of about 200 MHz to about 15 GHz depending on the impulse width, which corresponds to a free space electromagnetic radiation wavelength range of about 1.5 m to about 0.02 m. In a more preferred embodiment, the frequency range is about 1 GHz to about 300 GHz with a corresponding free space wavelength range of about 0.3 meter to about 1 millimeter (mm). In another more preferred embodiment, the frequency range is about 5 GHz to about 110 GHz with a corresponding free space wavelength range of about 0.06 m to about 2.7 mm.

The transmission pathway for a given element 38 of the transmitting column can be selected to be about the same length as the transmission pathway for the corresponding element(s) 38 of the receiving column to simplify calibration. Nonetheless, in other embodiments, the transmission/reception arrangement can differ. For example, in one alternative embodiment, one or more elements 38 are used for both transmission and reception. In another alternative embodiment, a mixture of both approaches is utilized. Typically, the signals received from array 36 are downshifted in frequency and converted into a processible format through the application of standard techniques. In one form, transceiver 42 is of a bi-static heterodyne Frequency Modulated Continuous Wave (FM/CW) type like that described in U.S. Pat. No. 5,859,609 (incorporated by reference herein). Commonly owned U.S. Pat. Nos. 6,703,964 B2; 6,507,309 B2; 5,557,283; and 5,455,590, each of which are incorporated by reference herein, provide several nonlimiting examples of transceiver arrangements. In still other embodiments, a mixture of different transceiver/sensing element configurations with overlapping or nonoverlapping frequency ranges can be utilized that may include one or more of the impulse type, monostatic homodyne type, bi-static heterodyne type, and/or such other type as would occur to those skilled in the art.

Transceiver 42 provides the data corresponding to the array signals to one or more processors 44 of subsystem 40. Processor(s) 44 can each be comprised of one or more components of any type suitable to process the data received from transceiver 42, including digital circuitry, analog circuitry, or a combination of both. Processor(s) 44 can be of a programmable type; a dedicated, hardwired state machine; or a combination of these. For a multiple processor form; distributed, pipelined, and/or parallel processing can be utilized as appropriate.

Memory 46 is included with processor(s) 44. Memory 46 can be of a solid-state variety, electromagnetic variety, optical variety, or a combination of these forms. Furthermore, memory 46 and can be volatile, nonvolatile, or a mixture of these types. Memory 46 can be at least partially integrated with processor(s) 44. Removable Memory Device (R.M.D.) 48 is also included with processor(s) 44. R.M.D. 48 can be a floppy disc, cartridge, or tape form of removable electromagnetic recording media; an optical disc, such as a CD or DVD type; an electrically reprogrammable solid-state type of nonvolatile memory, and/or such different variety as would occur to those skilled in the art. In still other embodiments, R.M.D. 48 is absent.

Subsystem 40 is coupled to motor 34 to selectively control the rotation of platform 32 with processor(s) 44 and/or transceiver 42. Subsystem 40 is housed in a monitoring/control station 50 that also includes one or more operator input devices 52 and one or more display devices 54. Operator input device(s) 50 can include a keyboard, mouse or other pointing device, a voice recognition input subsystem, and/or a different arrangement as would occur to those skilled in the art. Operator display device(s) 52 can be of a Cathode Ray Tube (CRT) type, Liquid Crystal Display (LCD) type, plasma type, Organic Light Emitting Diode (OLED) type, or such different type as would occur to those skilled in the art. Station 50 is arranged to be controlled by one or more portal operators (not shown).

System 20 further includes communication subsystem 60 coupled to subsystem 40 by communication link 62. Subsystem 60 includes network server 63 coupled to computer network 70. Computer network 70 can be provided in the form of a Local Area Network (LAN), a Municipal Area Network (MAN), and/or a Wide Area Network (WAN) of either a private type or publicly accessible type, such as the internet. Link 62 can be provided by such a network or be of a dedicated communication channel variety. Server 63 can be remotely located relative to subsystem 40. Indeed, in one embodiment, server 63 is coupled to a number of remotely located subsystems 40 with corresponding portals 30. In still other embodiments, more than one server 63 can be coupled to a common portal 30 and subsystem 40 arrangement. Alternatively or additionally, server 63 can be an integral part of subsystem 40. For yet other embodiments, server 63, network 70, and sites 80 are absent. Indeed, R.M.D. 48 can be used to alternatively or additionally transfer data between subsystem 40 and other computing/processing devices.

Server 63 is operable to communicate over network 70. Computer network 70 communicatively couples a number of sites 80 together. Each site 80 includes computer 82 arranged to communicatively interface with computer network 70. Each computer 82 includes one or more operator input device(s) 50 and one or more operator output device(s) 52 as previously described for subsystem 40, that are not shown to preserve clarity. Device(s) 50 and 52 at each site 80 selectively provide an operator input and output (I/O) capability. Computer 82 can be in the form of another subsystem 40, a personal computer or computer workstation, another computer server, Personal Digital Assistant (PDA), and/or a different configuration as would occur to those skilled in the art. While only two sites 80 are illustrated to preserve clarity, it should be understood that more or fewer can be coupled via computer network 70.

Collectively, server 63, computer network 70, and sites 80 provide an arrangement to remotely communicate with station 50. The interconnection of these components can be hardwired, wireless, or a combination of both. In lieu of or in addition to network 70, one or more of sites 80 and server 63 could be coupled by dedicated cabling or the like. Communication over network 70 can be used to monitor performance of station 50, update software associated with subsystem 40, remotely operate station 50 or portal 30, and/or share data pertinent to the recognition of suspicious objects with system 20 as will be more fully described hereinafter. In one such arrangement, one or more of sites 80 are configured as a repository for data pertinent to operation of system 20.

Figure 3:
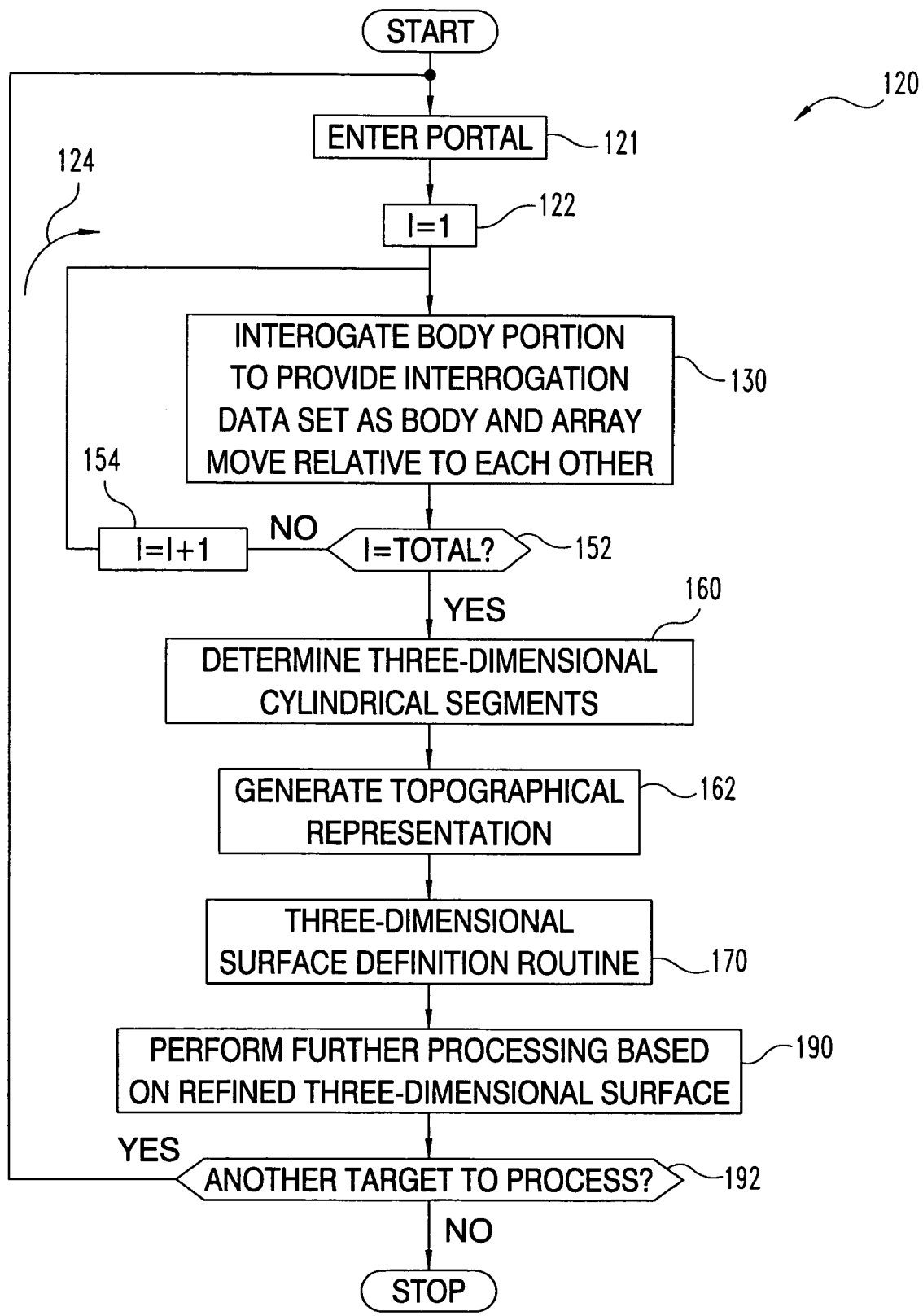
FIGS. 3 and 4 are flowcharts illustrating one procedure for operating the system of FIG. 1.

Referring additionally to the flowchart of FIG. 3, one mode of operating system 20 is illustrated as procedure 120. Procedure 120 begins with operation 121. In operation 121, person 22 enters portal 30 to be scanned/interrogated with system 20 to generate a three-dimensional representation of body B for mensuration; surface and/or contour analysis; hidden object detection, such as a weapon or contraband; object matching, mating, and/or comparison; or the like. Procedure 120 proceeds to initialization operation 122 that sets interrogation index "I" to one (I=1). From operation 122, procedure 120 enters interrogation loop 124 beginning with interrogation routine 130. Interrogation routine 130 interrogates a portion of person 22 within a field of view of array 36 as person 22 rotates on platform 32. Index I is an integer index to the number of different interrogation routines 130 performed as part of procedure 120.

Figure 4:
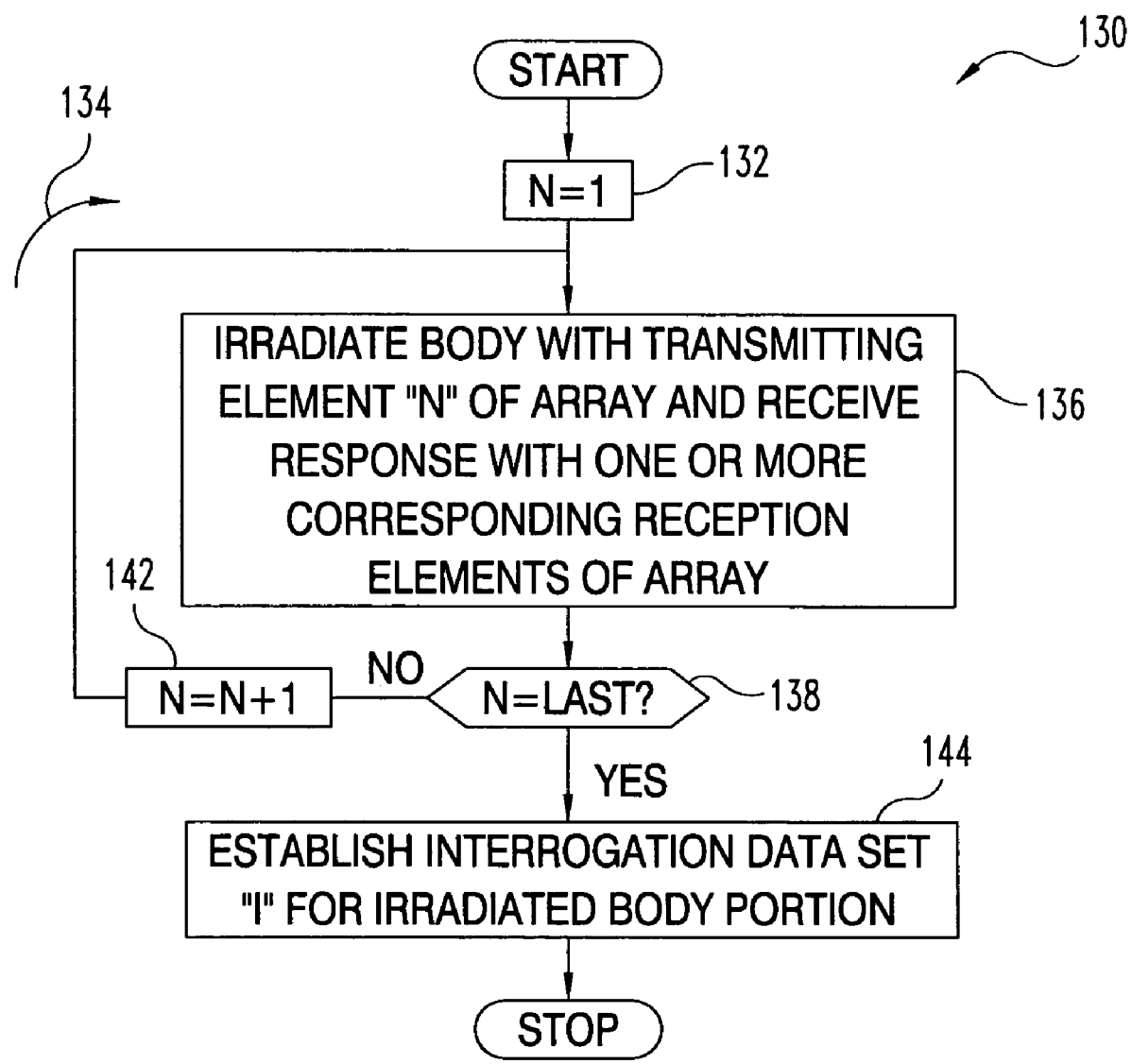

Referring to FIG. 4, interrogation routine 130 is further illustrated. Routine 130 begins with initialization operation 132 in which transmission index N is set to one (N=1). From operation 132, element sequencing loop 134 is entered, beginning with transmission/reception operation 136. Index N is an integer index to the number of transmission/reception operations 136 performed during routine 130. In operation 136, a portion of person 22 in the field of view of a transmitting element number "N" of array 36 is irradiated with electromagnetic radiation and one or more corresponding reception elements collect the reflected electromagnetic radiation in response to the transmission. The transmitting and reception elements are selected by logic of transceiver 42 with switching tree 43 as previously described. From operation 136, routine 130 proceeds to conditional 138, which tests whether transmitting element number "N" is the last element needed to transmit (N=LAST?); where LAST is the total number of the transmitting elements to be activated by transceiver 42.

In one form, for each execution of routine 130, transmitting element "N" sweeps through a selected frequency range twice, and the corresponding backscatter information for each of the two sweeps is received with a different reception element. The transmitting elements can be staggered relative to the reception elements such that transmitting element N aligns with a point between the two reception elements along a common axis of the array. U.S. Pat. No. 5,557,283 (incorporated by reference) describes an example of this arrangement of transmitting and reception elements. In other forms, a different technique can be utilized involving more or fewer sweeps, different types of sweeps, and/or different transmitting/reception orientations and numbers.

If the test of conditional 138 is negative (N<LAST), then increment operation 142 is performed, incrementing N by one (N=N+1). Loop 134 returns from operation 142 to transmission/reception operation 136 for execution with the transmitting/receiving subset of elements 38 corresponding to the new, incremented value of N from operation 142. In this manner, elements 38 are activated in a vertical path along array 36 with transceiver 42 to provide data along a contiguous region of person 22.

The resolution of interrogation information obtained with transceiver 42 can be enhanced by linearly sweeping through a selected ultrawide frequency range during each operation 136. In one preferred form, transceiver 42 sweeps through a range of at least 10 GHz for each execution of operation 136. This sweep can occur, for example, over a range of about 10 GHz to about 20 GHz. In a more preferred form, transceiver 42 and elements 38 are arranged for a sweep range of 16 GHz. This sweep can occur, for example, over a range of about 24 GHz to about 40 GHz. In one most preferred form, the ultrawide sweep range is selected such that the range resolution is generally the same as the lateral resolution. For these forms, elements 38 are selected to be of a type with a frequency response suitable for the selected sweep range, including, but not limited to the taper slot or end-fire antenna type. In another form, the transmitter can sweep through a given frequency range (such as 10 GHz to 20 GHz) in a pseudo-random order—sometimes known as frequency hopping.

Loop 134 is repeated LAST number of times, sequencing through the desired transmitting/receiving elements 38 of array 36 under the control of transceiver 42. When the test of conditional 138 is true, the affirmative branch proceeds to data operation 144. Data resulting from the execution of operation 136 is provided by transceiver 42 to processor(s) 44. In data operation 144, an interrogation data set is established for the information gathered through the repeated execution of operation 136 from N=1 through N=LAST. This data set corresponds to the current value of integer index I and the portion illuminated during these executions. Initially, the interrogation data set can be accumulated and organized by transceiver 42, processor(s) 44 or both; and then stored in memory 46 for further processing by processor(s) 44 as described in connection with the remainder of procedure 120. From operation 144, routine 130 returns to the next stage of procedure 120.

Referring back to FIG. 3, procedure 120 continues with conditional 152 that tests whether the final value of index I has been reached (I=TOTAL?); where TOTAL is the total number of desired executions of loop 124 (and routine 130) for procedure 120. If the test of conditional 152 is negative (I<TOTAL), procedure 120 continues to increment operation 154 to increment index I by one (I=I+1). Loop 124 then returns to routine 130 for the next execution until I is incremented to be equal to TOTAL.

With the execution of loop 124 TOTAL number of times, TOTAL number of interrogation data sets are stored in memory 46. When the test of conditional 152 is true, procedure 120 continues with cylindrical segmentation operation 160. In operation 160, the interrogation data sets are processed with processor(s) 44 to generate a number of cylindrical image data sets that each correspond to an arc segment of cylinder C. Referring to FIG. 2, arc segment S1 subtends a viewing angle V of about 90 degrees with respect to person 22. Arc segment S1 defines a cylindrical aperture CA that extends along axis R. The image data set corresponding to arc segment S1 represents the three-dimensional surface of body B that is reflective with respect to the selected electromagnetic radiation, as if viewed through cylindrical aperture CA. In one convenient form, the image data set is defined in terms of cylindrical coordinates, although any three-dimensional coordinate system can be used. Each image data set is determined from the interrogation data gathered for the corresponding arc segment by processor(s) 44. Reference is made to commonly owned U.S. Pat. No. 5,859,609 (incorporated herein by reference) for further description about the determination of cylindrical image data.

Figure 5:
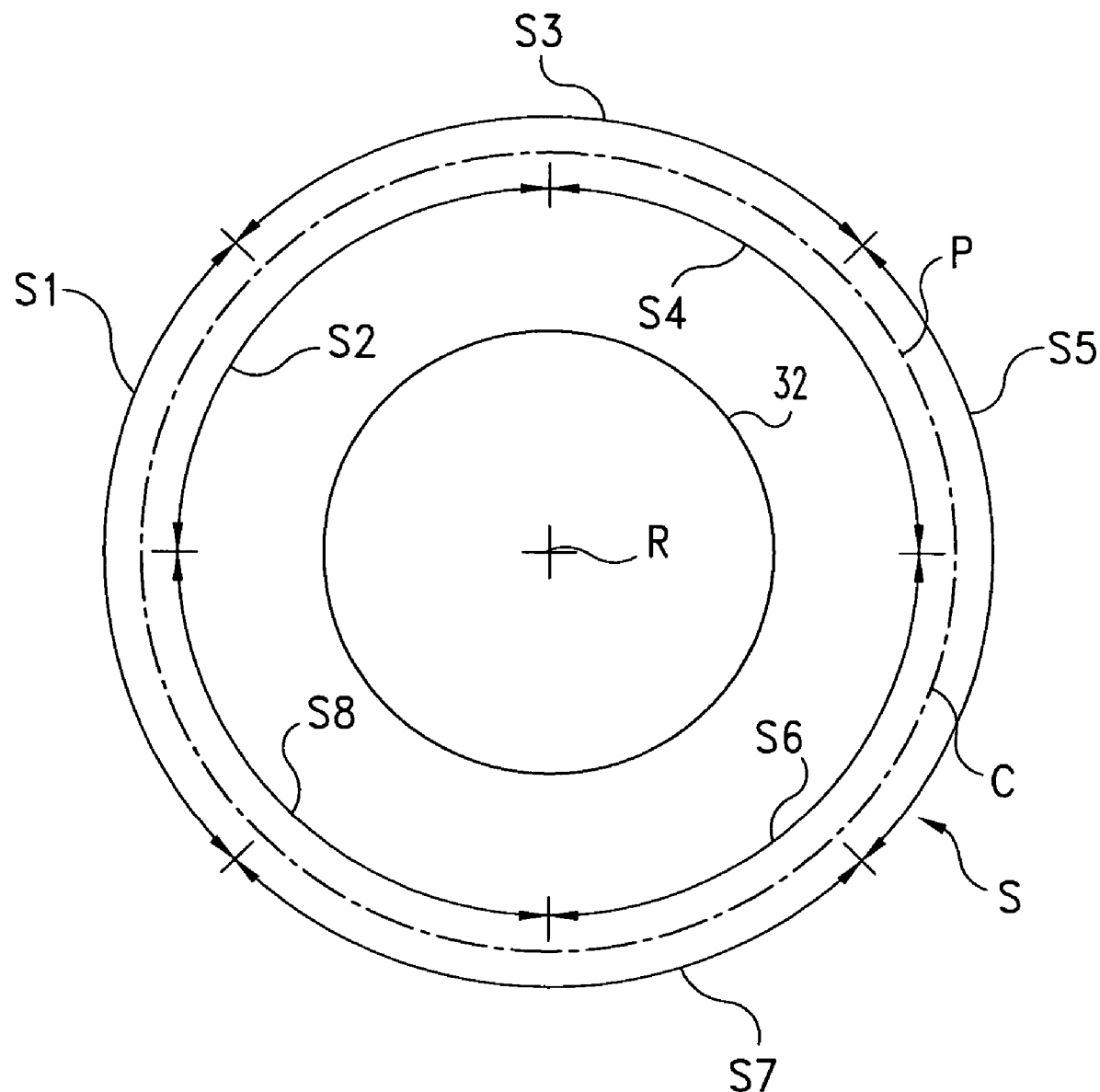
FIG. 5 is a schematic, top view of the system of FIG. 1 illustrating a number of overlapping arc segments.

During operation 160, cylindrical image data sets are determined for a number of arc segments about axis R that collectively circumscribe person 22. In FIG. 5, eight overlapping arc segments S1, S2, S3, S4, S5, S6, S7, and S8 (collectively segments S) are illustrated with respect the generally circular pathway P and corresponding cylinder C. Segments S1, S3, S5, and S7 are schematically represented by double-headed arrows slightly to the outside of path P and segments S2, S4, S6 and S8 are schematically represented by double-headed arrows slightly inside path P to preserve clarity. In FIG. 5, segments S each correspond to a viewing angle of about 90 degrees, and each one overlaps two others by about 45 degrees. It should be understood that each different segment S corresponds to a representation of a different portion of person 22. In other embodiments, the viewing angle can differ and/or may be nonuniform from one arc segment S to the next. Alternatively or additionally, overlap may be intermittent or absent.

Procedure 120 continues with mapping operation 162. In operation 162, the image data obtained for the circumscribing arc segments S are mapped by processor(s) 44 to a common surface for body B, which is turn defines a common volume of body B. Operation 162 can include reconciling a data point for one of the arc segments S for a given location that differs by a threshold amount from the data point of the same location for another of the arc segments S. In one embodiment, an averaging technique is used and intermediate data points are interpolated. In another embodiment, a weighting function is utilized that progressively reduces the contribution of a data point as the distance of that data point from the midpoint of the corresponding arc segment S increases. The cylindrical data sets are preferably combined incoherently (after computing the magnitude) to reduce undesirable phase interference in the images. Operation 162 provides a topographical representation of body B and the volume bounded by its surface(s) about axis R that are reflective with respect to the electromagnetic radiation used for the interrogations of routine 130.

It should be appreciated that while a focused three-dimensional surface representation results from operation 162, for certain interrogated targets and under other circumstances/situations, the topographical representation determined in operation 162 may include a varying degree of uncertainty as to the specific position and/or presence of the target surface. Typically, when interrogating various portions of body B in this manner, this spatial surface variation can be depicted in terms of a relatively thick cross-sectional region of pixelated elements within which the actual surface may lie. For such depictions, the thickness may also frequently vary from several elements to only one or two depending on the level of the returned signal detected, and/or may include gaps where no surface-representing elements are provided even though the surface is present there. Such variations are also often dependent on various operating parameters, such as the shape, size, and position of the interrogation target relative to characteristics of the interrogation operation.

Figure 6:
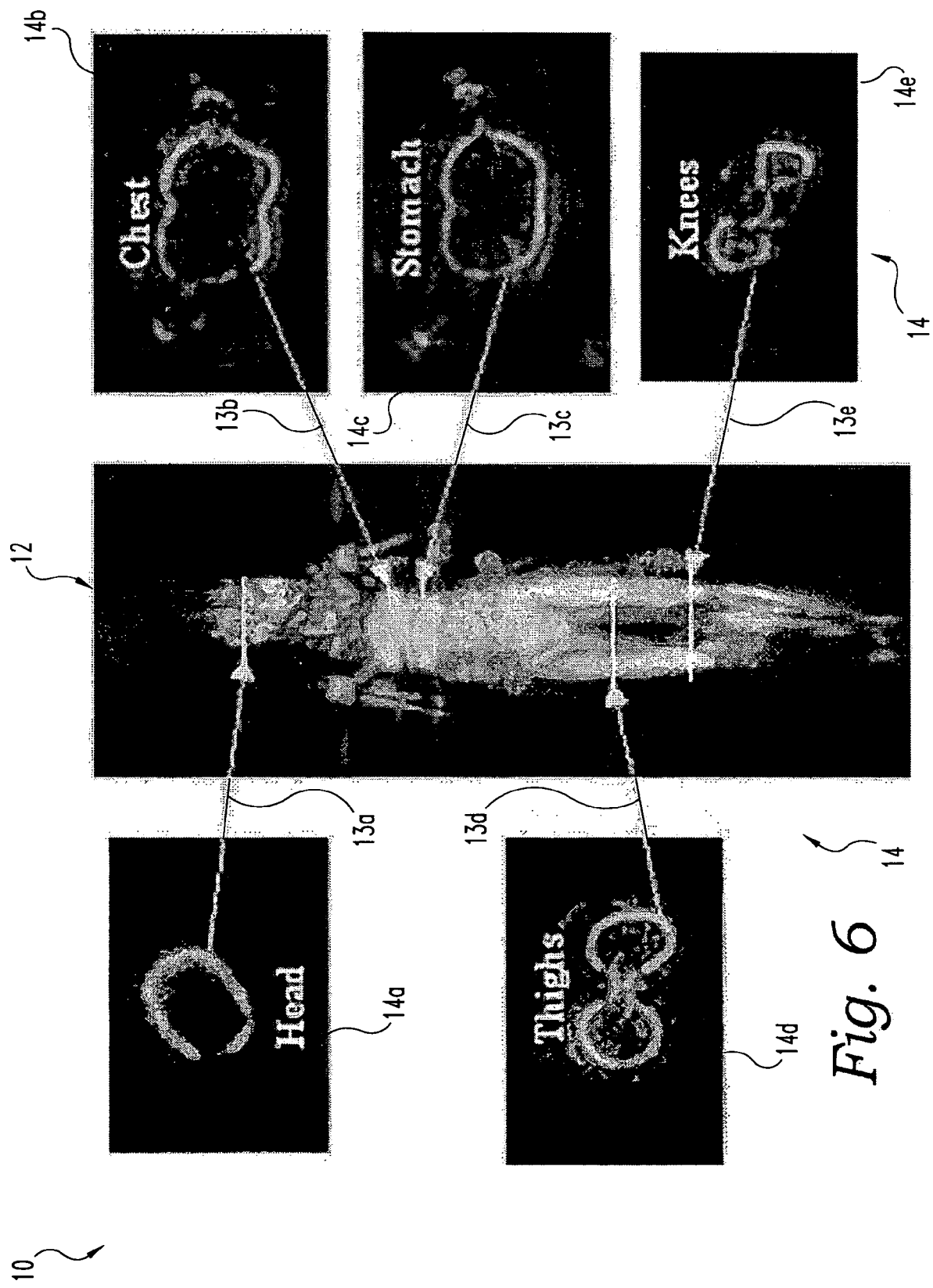
FIGS. 6 and 7 are computer-generated images provided in accordance with the procedure of FIGS. 3 and 4.

Referring to FIG. 6, images 10 are depicted in computer-generated, pixelated form. Images 10 were determined from topographical data generated by experimentally performing operation 162 of procedure 120. Images 10 include topographical image 12, which corresponds to a front view of a clothed person; where the person's clothing is generally transparent to the interrogating electromagnetic radiation. Images 10 also include two-dimensional, sectional images 14. Correspondingly, sectional images 14 are more specifically designated head sectional view 14a, chest sectional view 14b, stomach sectional view 14c, thigh sectional view 14d, and knee sectional view 14e. Interconnecting section lines 13a, 13b, 13c, 13d, and 13e show the positional relationship between image 12 and sectional images 14. In general, sectional images 14 each extend along an approximately horizontal plane relative to an interrogated person when in a standing position, but can vary in other embodiments relative to horizontal/vertical axes.

Figure 7:
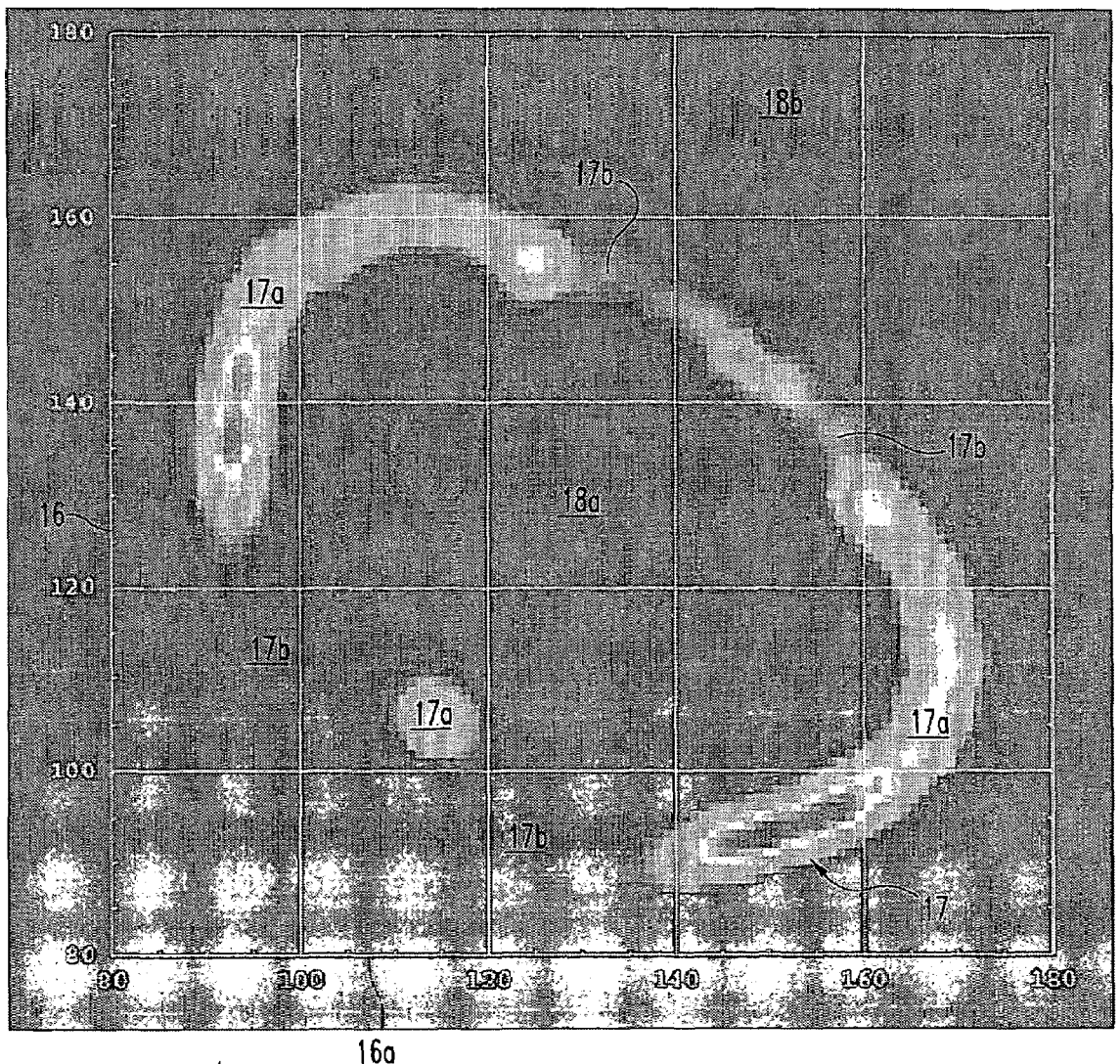

Referring to FIG. 7, a two-dimensional, torso sectional view 16 is illustrated in greater detail as a computer-generated gray scale image. View 16 was experimentally determined in accordance with procedure 120. A coplanar image grid 16a is overlaid on view 16 with relative element values ranging from 80 to 180 on corresponding perpendicular axes. These axes and grid 16a correspond to x and y axes commonly utilized in Cartesian coordinate positioning. In view 16, a thick, closed curve 17 with a generally oval or kidney shape corresponds to the surface information returned by the interrogation. The lighter portions 17a of curve 17 correspond to the stronger, more intense (higher level) electromagnetic radiation signals returned during interrogation, while the darker portions 17b correspond to the weaker, less intense (lower level) return signals. The darkest regions, internal region 18a and external region 18b, generally represent areas were the return signal was not detected above a selected threshold, corresponding to background return levels.

Figure 8:
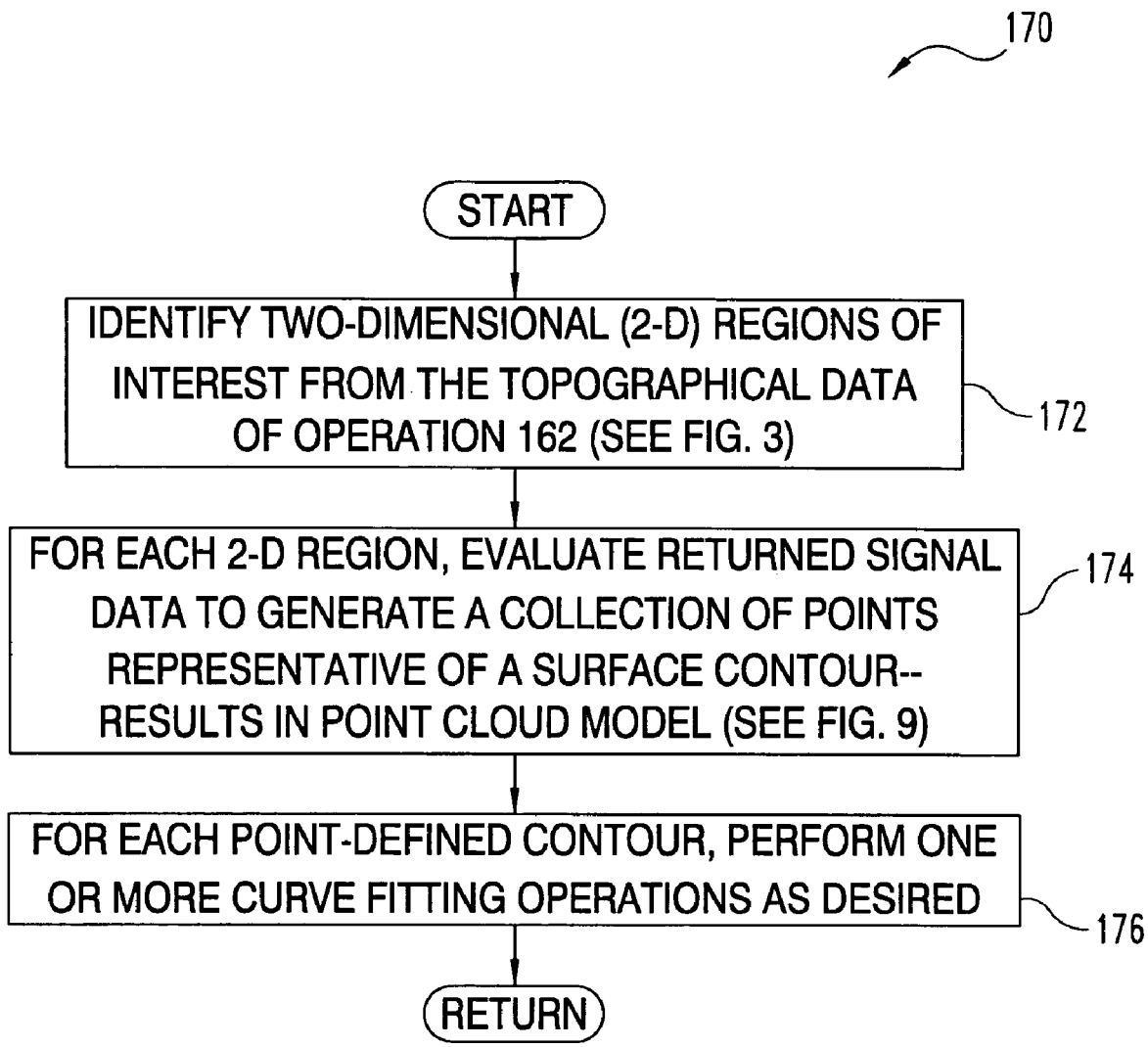
FIG. 8 is a flowchart illustrating one routine for performing three-dimensional surface definition according to the procedure of FIGS. 3 and 4.

Referring back to FIG. 3, procedure 120 continues with three-dimensional surface definition routine 170. Routine 170 is further illustrated by the flowchart of FIG. 8. Routine 170 begins with operation 172 in which two-dimensional regions of interest are identified from the topographical data generated during operation 162 (see FIG. 3). In one embodiment, a region of interest represents a cross-section through the data volume along an x-y (horizontal) plane in rectangular coordinate terms. In yet another embodiment, a region of interest may be that portion of the data volume that represents a cross-section perpendicular to a person's limb. In still other embodiments, sections may be selected along any other plane, and/or the region of interest based on a space-designating function other than a plane, such as a rectilinear or curvilinear line, plane, or other surface-defining feature. Various two-dimensional regions of interest are illustrated in view 16 of FIG. 7 and sectional images 14 of FIG. 6.

Figure 9:
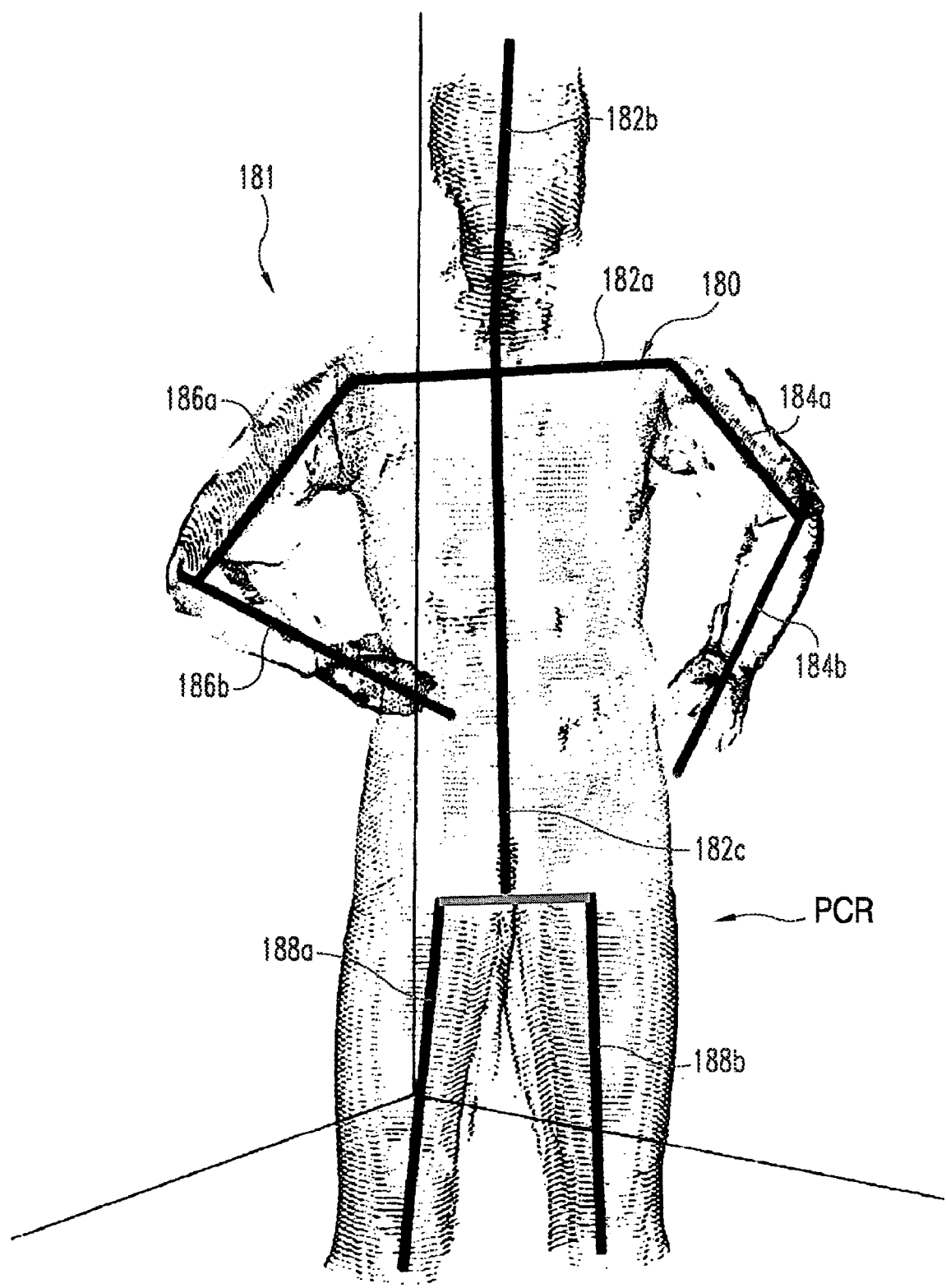
FIG. 9 is a computer-generated image corresponding to an experimental point cloud representation of a person determined from topographical data generated with the routine of FIG. 8.

From operation 172, routine 170 continues with operation 174. For each two-dimension region of interest, operation 174 evaluates the surface information returned by interrogation to generate a collection of points which are representative of a surface contour of the corresponding section. Collectively, the points from multiple sections can be accumulated to provide a three-dimensional point cloud model of the surface as illustrated in FIG. 9 and the leftmost image panel of FIG. 17. From the potentially ambiguous volume data provided by operation 162 (such as view 16 of FIG. 7), this point cloud model refines the data to discrete points along the surface.

Figure 10:
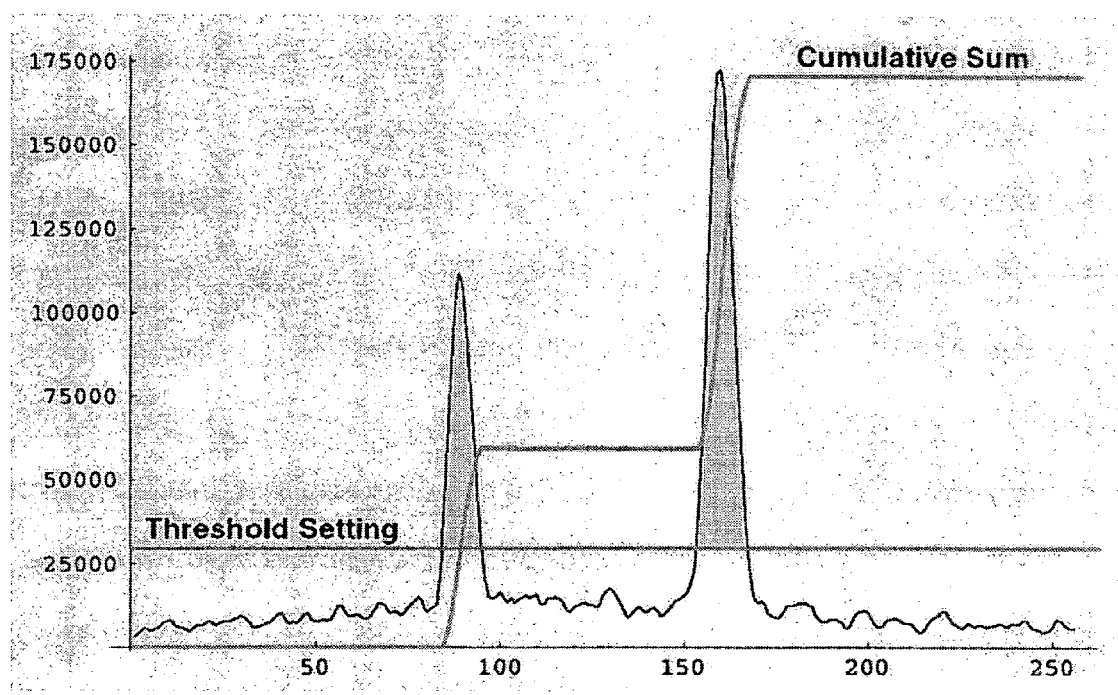
FIG. 10 is a graph illustrating certain aspects of the routine of FIG. 8.
Figure 11:
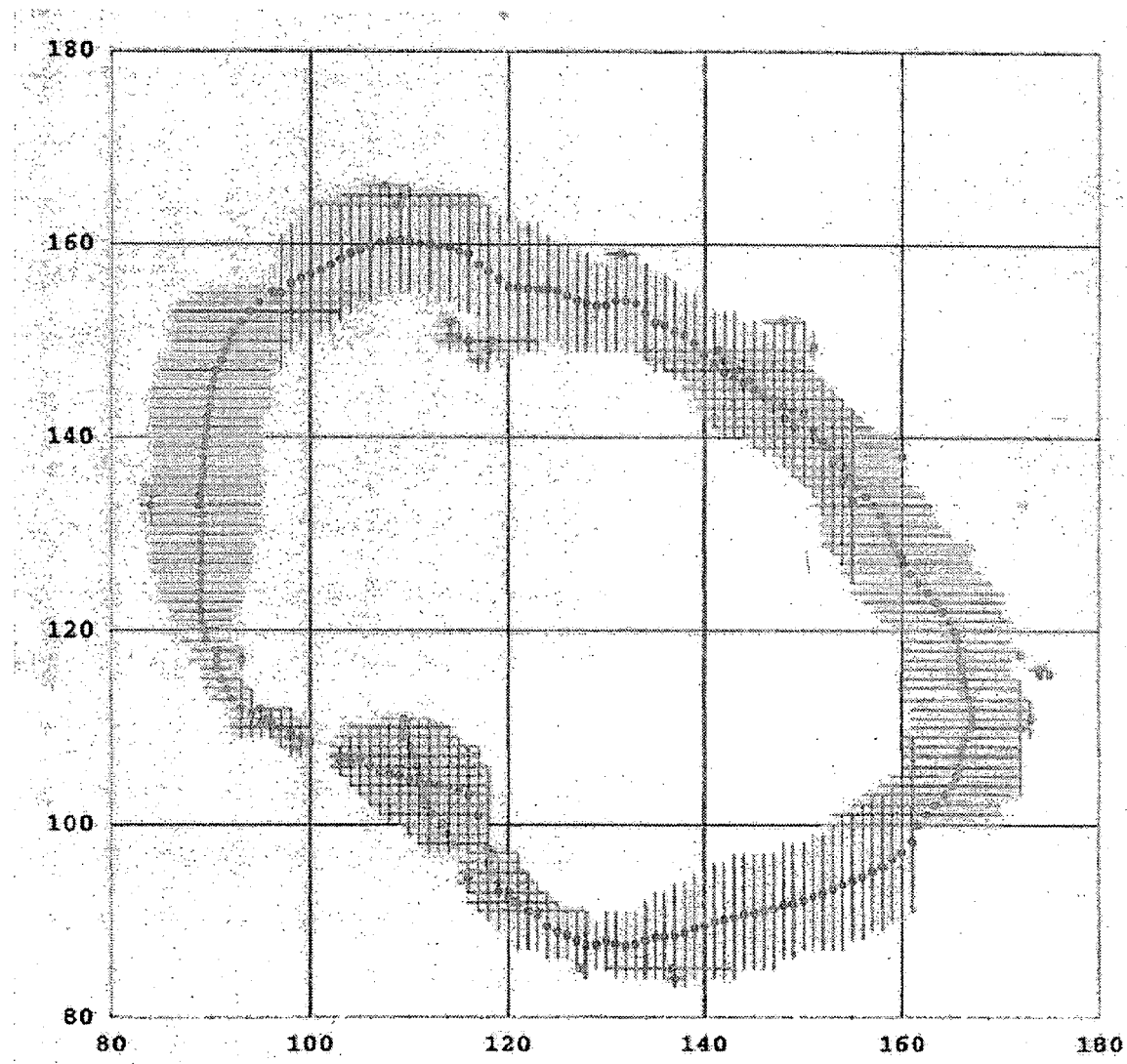
FIG. 11 is a computer-generated plot corresponding to various aspects of one embodiment of peak detection processing.

Referring to FIGS. 10 and 11, one embodiment of operation 174 is described. In this embodiment, the "thick" surface data returned by operation 162 for the two-dimensional region of interest is evaluated relative to axes extending along such region. In FIG. 11, the reference axes correspond to the horizontal and vertical line segments depicted relative to the same grid utilized in FIG. 7. This form of "X-Y" (rectangular coordinate) analysis interrogates each two-dimensional region of interest by evaluating the data volume along each different reference axis. The reference axes each extend in one or two mutually perpendicular directions, each being approximately parallel with or perpendicular to the others.

FIG. 10 is an illustration of a data profile that corresponds to variation in the signal returned during interrogation along a single one of these reference axes. In FIG. 10, the horizontal axis represents the relative position from which the signal was returned and the vertical axis represents relative signal magnitude. Correspondingly, the peaks of the FIG. 10 profile each represent surface data that likely corresponds to the actual surface of target T. To estimate the location of the peaks, a threshold value is selected to discriminate between meaningful, correlated signals and background noise. This threshold value can be selected by use of a histogram of the data volume or by application of another technique. In FIG. 10, this threshold value is represented by a horizontal line bearing the label "Threshold Setting."

FIG. 10 depicts a stair-step line plot that increases from left to right and bears the label "Cumulative Sum." This plot corresponds to the cumulative sum of profile data for points above the selected threshold, which are depicted by a darker shade of gray for the peaks above the threshold line. In the Cumulative Sum line plot, the midpoint in each plateau of the plot corresponds to half the area of the associated peak. An interpolation of the profile distance for this point provides an estimate of peak position for peaks approaching a Gaussian type of distribution—being relatively insensitive to noise. Alternatively or additionally, different estimation techniques can be utilized with or without a near Gaussian type peak profile. Data representative of respective peak positions and respective peak widths is provided for all peaks above the threshold. The peak position and width determination is performed for each peak along the designated reference axes for the two-dimensional region.

Turning to FIG. 11, the resulting peak position is represented by a dot along a line segment representative of the magnitude of the peak width. As previously indicated, each of the line segments of FIG. 11 correspond to one of the reference axes utilized in performing the peak detection routine described and illustrated in connection with FIG. 10. With respect to the orientation of FIG. 11, each vertical line segment corresponds to a different Y reference axis and each horizontal line segment corresponds to a different X reference axis; where the Y reference axes and the X reference axes are perpendicular to one another. It should be appreciated that the data can be further refined by using peak width information to filter out contributions that result from a grazing or tangential intersection of the reference axis with the data volume. The resulting peak position points are representative of a two-dimensional surface contour line. This line may be provided by connecting the points together and/or by other techniques such as curve fitting to be further described hereinafter.

Figure 17:
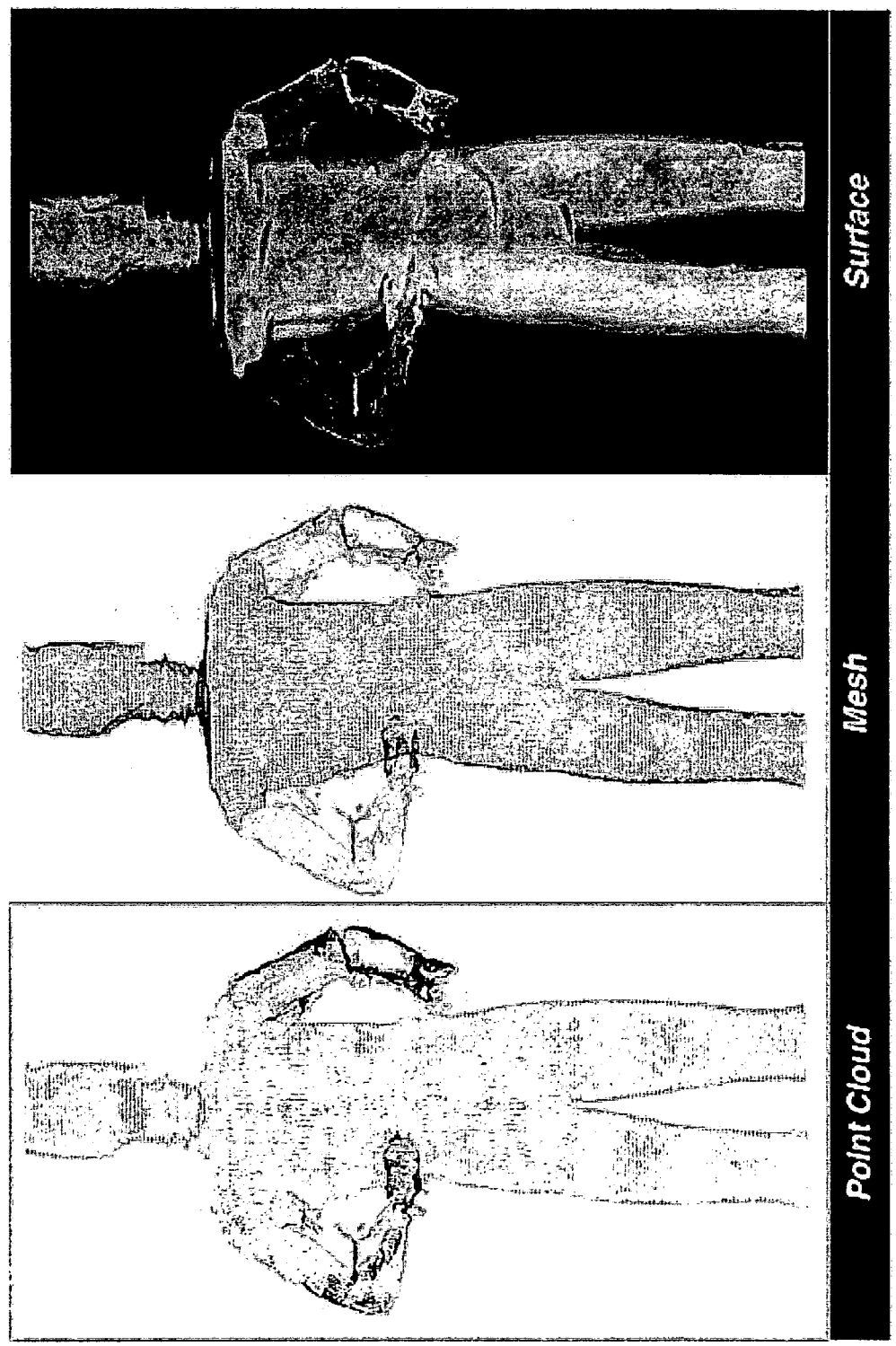
FIG. 17 is a comparative graph of various forms of surface rendering that can be provided in accordance with the refined, three-dimensional surface definition provided by the routine of FIG. 8.

Alternatively or additionally, the resulting list of peak positions from a number of different sections can be used to generate a three-dimensional point cloud model, nonlimiting examples of which are shown in FIGS. 9 and 17. If desired, the X-Y analysis routine described in connection with FIGS. 10 and 11 can be utilized to provide a point cloud model without a priori knowledge of the configuration, pose, or position of target T. Further, while XY analysis can be used alone, in other embodiments it may serve as an initial stage of operation 174, with subsequent stages providing different and potentially more refined surface, contour, and/or point cloud information. The representation shown in FIG. 11 was experimentally determined from the data corresponding to the FIG. 7 depiction.

Figure 12:
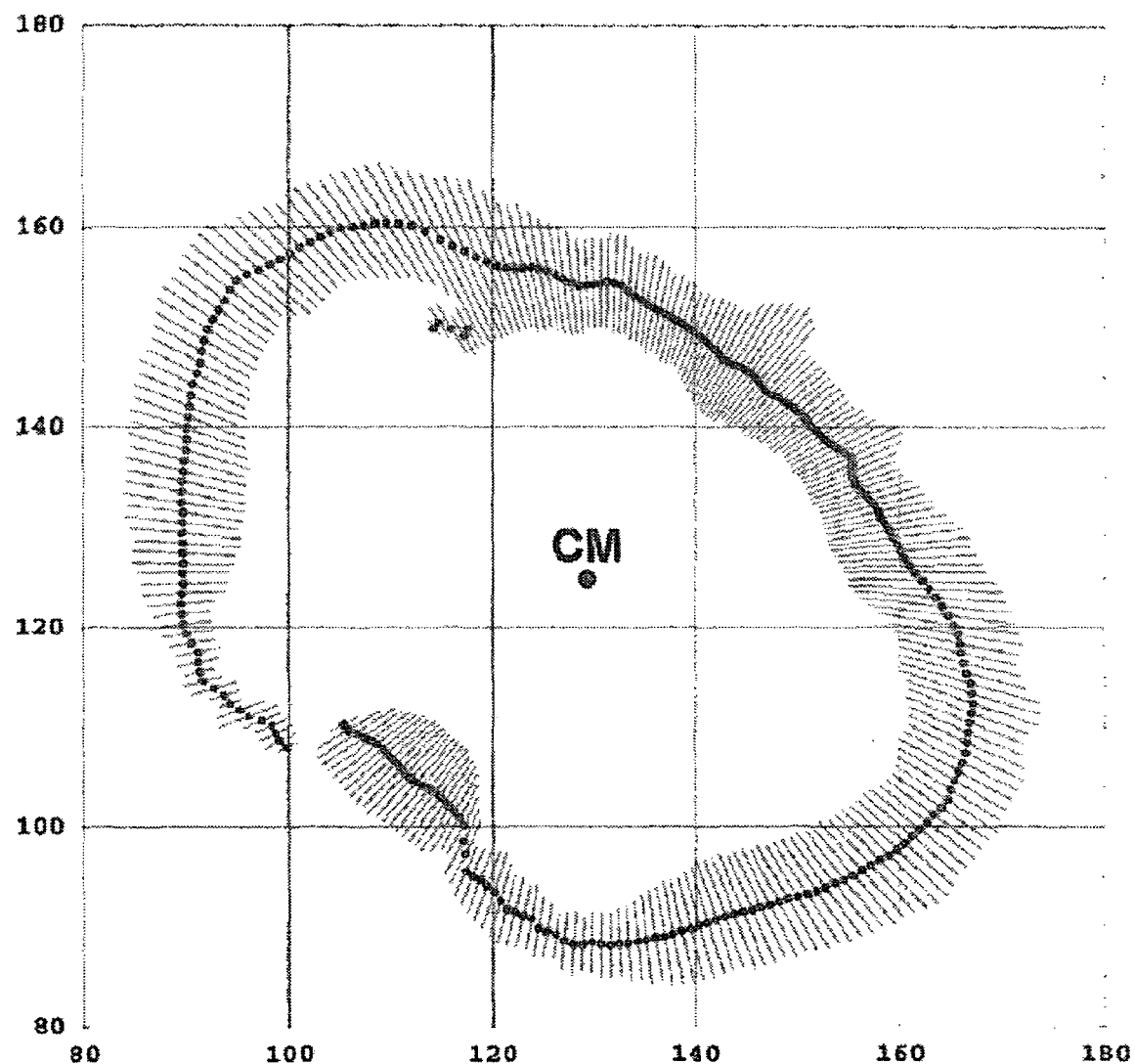
FIG. 12 is a computer-generated plot corresponding to various aspects of another embodiment of peak detection processing.

In another embodiment of operation 174, two-dimensional sectional regions are evaluated by processing the representative data along radially extending reference axes instead of the rectangularly oriented reference axes that are either approximately parallel or perpendicular to one another as described in connection with FIGS. 10 and 11. FIG. 12 is a visual depiction of the application of radial reference axes using the same data as for FIG. 11. In FIG. 12, the different line segments each correspond to a different reference axis. These radial reference axes each have a common origin designated CM in FIG. 12. In one form of this embodiment, processing includes:

(a) determining the origin CM as the "center of mass" (or two-dimensional centroid) of the region by application of a preliminary X-Y analysis performed as described in connection with FIG. 11 (in one particular form applying the X-Y approach, the center of mass is calculated based on intensity-weighted grid with values above a selected threshold level);

(b) establishing the radial axes extending from origin CM with generally uniform angular spacing from one to the next;

(c) evaluating the data along each radial reference axis to identify each peak above a selected threshold and determine the peak position and width of each such peak (collectively comprising the peak profile for each axis); and (d) converting the peak profile data to rectangular coordinates as described in connection with FIG. 11 for further processing, as desired.

The radial line segments of FIG. 12 each correspond to a peak width and the dot of contrasting gray-scale shading corresponds to peak position. The FIG. 12 information is visually depicted against the same grid as shown in FIGS. 7 and 11. The resulting peak positions collectively provide points to define a surface contour about origin CM. By collecting data for different sectional regions, a three-dimensional point cloud can be generated as illustrated in FIG. 9 or 17.

It has been discovered that reference axes oriented approximately normal to the interrogated surface can provide a higher degree of surface position estimation relative to other orientations. Accordingly, in some applications, X-Y analysis described in connection with FIG. 11 can be better-suited to interrogation of properly oriented rectilinear surfaces; while radial analysis described in connection with FIG. 12 can be better-suited to interrogation of approximately circular surfaces, such as the head, neck and torso when target T is a person. Alternatively, in other embodiments, it is desirable to use X-Y and/or radial analysis regardless of the sectional/surface shape. In other still other embodiments, reference axes may be oriented in accordance with a different pattern selected to match the expected sectional shape of the surface of target T, such an elliptical surface shape, concave surface shape, spherical surface shape, parabolic surface shape, or other different surface shape/contour as would occur to one skilled in the art.

In yet another embodiment, an initial point cloud generated by the X-Y analysis approach is utilized to provide location and pose information regarding a human form of target T. Given this X-Y based point cloud, and knowledge of the basic human shape, a general human body representation can be derived that corresponds to the skeletal orientation of the major portions of the body. FIG. 9 illustrates such a representation in the form of a skeletal vector model. As used herein, a "skeletal vector model" refers to a representation of the human body that provides relative size and orientation information about the torso and limbs of the body. Alternatively or additionally, this model can include representations of the head, neck, feet, hands, shoulder, chest, hips, and/or other portion of the human body as desired. In one form, a skeletal model characterizes each different body part with a line segment having a length (magnitude) proportional to the body part longitude, and an angular orientation (direction) corresponding to orientation of the respective body part relative to the other represented parts.

In FIG. 9, skeletal vector model 180 is superimposed on a point cloud representation. Individual skeletal vector line segments 181 are shown which represent the chest vector 182*a*, head/neck vector 182*b*, torso vector 182*c*, upper arm segment vectors 184*a* and 186*a*, lower arm segment vectors 184*b* and 186*b*, and leg segment vectors 188*a* and 188*b*. One procedure for implementing a skeletal vector model, involves providing skeletal descriptor data that includes node points in three-dimensional space (xyz) that generally correspond to points where one body part can move (articulate) relative to another body part. The skeletal descriptor file can be constructed by manually selecting the nodes from the X-Y analysis point cloud data or, alternatively, can be constructed automatically in accordance with expected proportions between corresponding body parts and/or other predetermined knowledge of the human shape, a combination of these, or such different techniques as would occur to those skilled in the art. The vectors extend between the nodes, with proportional lengths and orientation corresponding to the body parts of interest. While shown as unadorned line segments in model 180, in other forms arrowheads and/or other visual indicators may be utilized.

A skeletal vector model can be utilized to provide more refined radial reference axis analysis of arms and legs of the target T, and/or other body parts. One approach involving skeletal vector models, includes:

(a) for each vector, calculating a direction cosine with the rectangular coordinate-based x, y, and z axes from the X-Y analysis of different horizontal sections of target T in a standing position (where each section is taken at a different vertical position corresponding to the "z" coordinate along the height of target T);

(b) selecting the rectangular coordinate plane (xy, xz, yz) that is most nearly perpendicular to each vector;

(c) evaluating two-dimensional slices (sections) through the data volume oriented to the selected plane (xy, xz, yz) along the length of the respective vector (line segment);

(d) analyzing the individual slices of data along the selected plane (xy, xz, yz) using the vector location as the origin (CM in FIG. 12); and (e) performing radial analysis using radial reference axes with approximately equal angular spacing on the selected plane (xy, xz, yz) that each extend from the vector-coincident origin.

For each skeletal vector line segment 181 a signal threshold setting and/or a maximum radial search distance can be specified manually and/or automatically. The resulting radial data can be converted to xyz information as described in connection with FIG. 12 and utilized to generate a point cloud model. It should be appreciated that FIG. 9 illustrates both a point cloud and corresponding skeletal vectors for ease of explanation; however in other embodiments one or more models used may not be provided in a visual form and/or may be differently visualized. For example, FIG. 17 provides a point cloud representation without skeletal vectors. In still other examples, a different visualization may be used or no visualization may be used at all.

Referring back to FIG. 8, three-dimensional surface definition routine 170 continues from operation 174 with operation 176. For each point-defined contour, operation 176 performs one or more curve fitting operations. In some applications, curve fitting operation 176 can be utilized to provide more detail in the surface approximation, such as smoothing the surface between available cloud model points and/or filling a gap where the surface is present but not adequately represented in the data.

Figure 13:
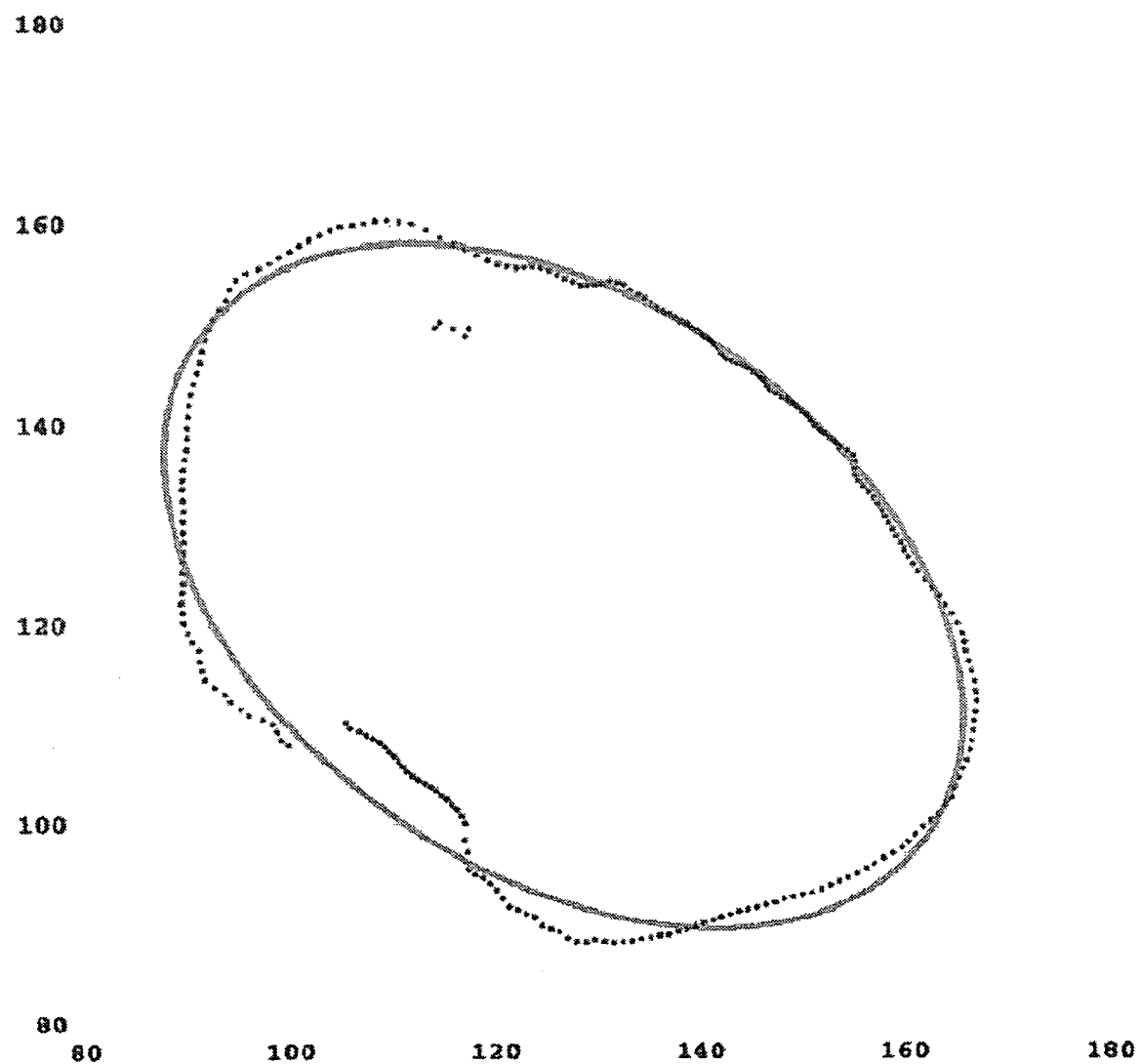
FIGS. 13 and 14 are computer-generated plots corresponding to various aspects of elliptical curved-fitting.

FIG. 13 visually represents one curve fitting option for operation 176. FIG. 13 shows an ellipse (solid line) obtained by a least squares fit of the peak position points, which are also represented in the illustration by dots. These points are the same as those determined with radial analysis, as depicted in FIG. 12. Correspondingly, the FIG. 13 illustration is also based on the "raw" topological data of FIG. 7, and shown against the same grid 16a. In one embodiment, the elliptical curve fitting procedure uses the commonly applied "steepest descent" technique, which calculates five parameters to specify the location, shape, and orientation of the ellipse.

Figure 14:
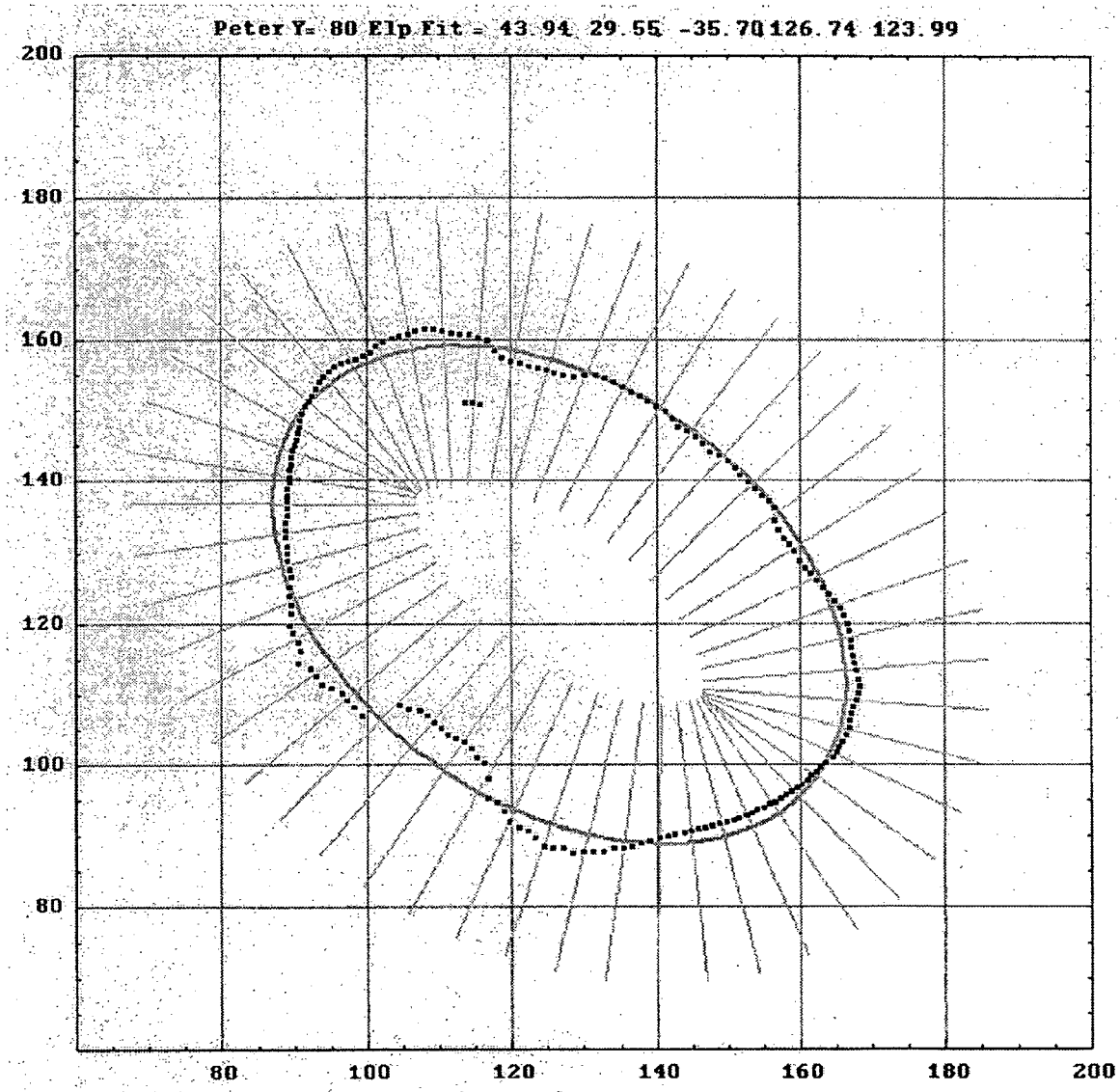

From this elliptical boundary, analysis can be performed based on reference axes normal to the resulting surface contour ellipse. FIG. 14 provides an illustration of this form of analysis with the reference axis shown depicted by line segments at generally uniform intervals relative to the elliptical boundary. Certain data points are also depicted. The surface model depicted in the rightmost image of FIG. 17 was determined through this technique as applied to a number of different cross sectional data sets.

Figure 15:
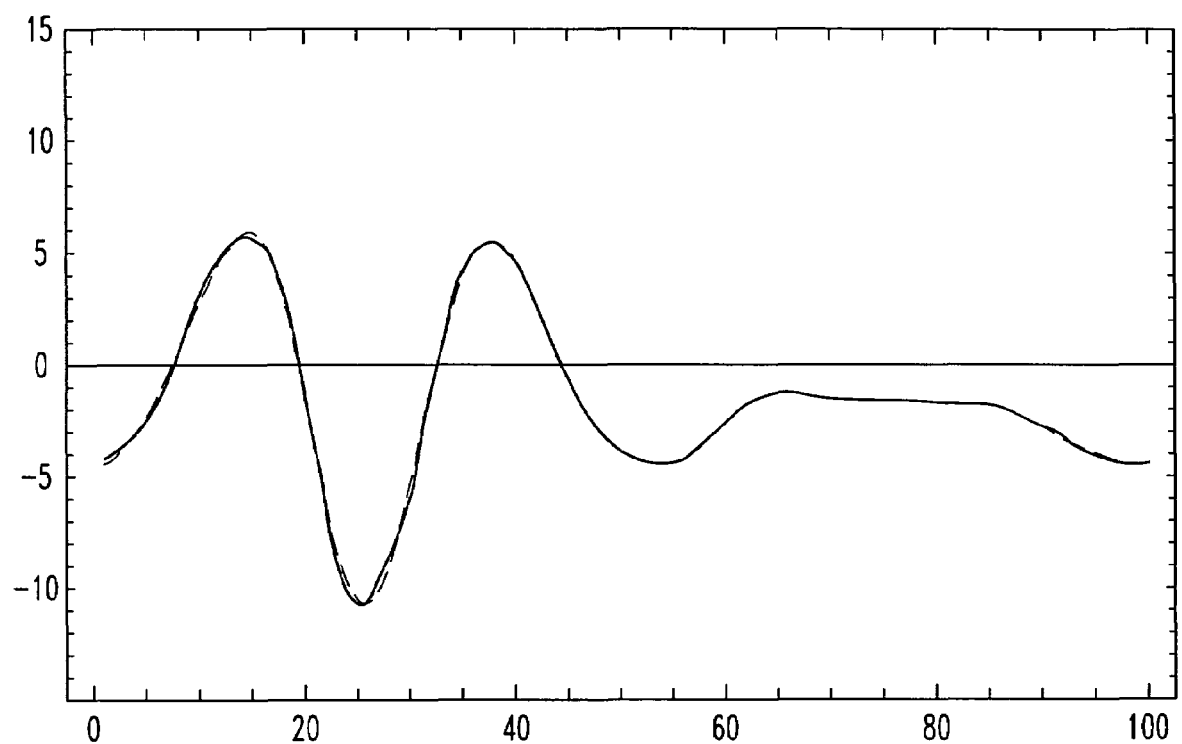
FIGS. 15 and 16 are computer-generated plots corresponding to various aspects of Fourier boundary fitting.

In still some applications, gaps in the surface data where the surface is actually present can be further addressed by more refined analytical boundary fitting. Referring to FIG. 15, it should be appreciated that the depicted solid line plots the difference between the elliptic approximation to the surface and the located surface as measured along an axis normal to the ellipse. When this solid curve is added to the representative ellipse, a more accurate representation of the surface results for this example. In FIG. 15, the horizontal axis provides relative values ranging from 0 to 100 to represent the angular position of the measurement and the vertical axis provides element difference values ranging from −15 to +15 to represent the relative difference between the elliptic approximation to the surface and the located surface at each position.

It should be appreciated that the solid line difference plot of FIG. 15 approximates a periodic function for a 360 degrees revolution along the corresponding ellipse. When further refinement is desired, a further fitting technique can be applied based on this periodicity. One option is the application of Fourier series terms to improve the curve fit for certain embodiments of the present invention as part of operation 176. FIG. 15 represents a Fourier series curve correction based on ten terms, where the Fourier correction is shown as an overlapping dashed line. Naturally, other periodic curve fitting techniques, aperiodic curve fitting techniques, and/or different term quantities, as applicable, can be utilized in other embodiments where refinement of a fitted curve is selected. By approximating the difference curve, the Fourier series correction can be utilized to refine the ellipse for a given section (slice).

Figure 16:
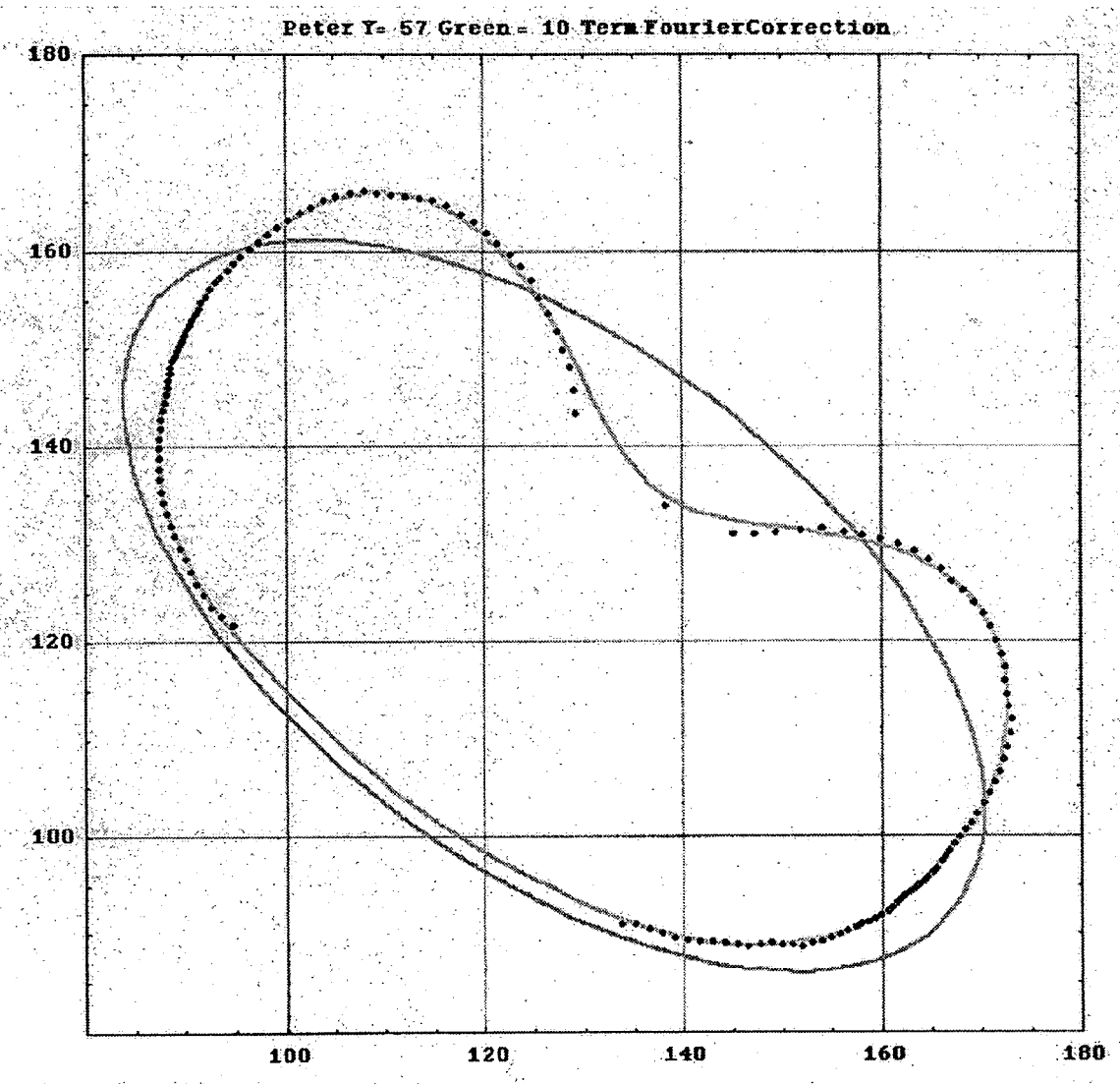

By way of nonlimiting example, FIG. 16 illustrates the addition of a Fourier series corrected curve (solid line that is generally kidney shaped) relative to the elliptical curve fit (dashed line) and selected data points (dots). FIG. 16 is plotted with grid 16a for further comparison to the original topological source data depicted in FIG. 7. The corrected curve results by adding the Fourier series correction to the elliptical curve fit. It should be appreciated that data gaps are better approximated by the corrected curve relative to the ellipse in this example—although such corrections may not be desired and/or may not result in other applications.

Referring back to FIG. 8, after the execution of operation 176, routine 170 returns to procedure 120. Accordingly, procedure 120 continues with operation 190 as depicted in FIG. 3. In operation 190, further processing is performed based on the surface definition provided by routine 170. In one embodiment, the further processing of operation 190 is only the display of a resulting point cloud model based on rectangular (X-Y) and/or radial analysis, with or without curve fitting and/or analytic boundary correction/definition. In another embodiment, the surface may not be displayed or visualized at all.

In still other embodiments, processing of operation 190 can include interpolation of a resulting point cloud representation returned by routine 170—such as can be obtained through the application of a mesh. An example is provided in the center image panel of FIG. 17. For the purposes of determining a mesh, the node points optionally can be calculated directly form the desired analytic boundary function. Operation 190 can further include mesh decimation and fitting with higher-order representations, such as B-splines, to provide a desired surface model. At this stage, a "Barbie Doll" model based on the desired level of analytic boundary definition can be provided; where the elliptical curve corresponds to the lowest order of such a definition. In yet other embodiments, operation 190 processing includes shadow removal, presentation of a wire-frame or mannequin representation (such as to hide private body features), an interface to a computer-aided image and/or drawing program, or the like.

Alternatively or additionally, one or more measurements of body B can be made during operation 190 based on the results of operation 170. For this determination, a reference unit corresponding to the desired measurement can be provided on platform 32; a marker on a background panel, floor, and/or ceiling; or by a different technique as would occur to those skilled in the art. This reference is used to quantify the desired measurement in terms of desired units.

In one application, body measurements correspond to those desired to size clothing for person 22. For this application, the interrogating electromagnetic radiation is selected to be generally transparent to and/or penetrate clothing 24a, 24b to provide lineal body measurements that correspond to the skin surface of person 22—including skin surfaces beneath clothing 24a and 24b. The selection of electromagnetic radiation frequency and/or frequency sweep range is made to provide the desired resolution of the body measurements.

Commonly, body measurements to fit clothing include circumferences of the neck, chest, waist, and/or hip region. Other lineal or distance measurements can include inseam, sleeve, and/or torso lengths. Still further measurements include palm and/or foot girth for the purposes of fitting gloves and/or footwear, respectively. In addition to common clothing, hair is also generally transparent to interrogation with system 20. Accordingly, measurements of head circumference without hair or a different head measurement can be provided, which may be useful in determining hat size, helmet size, or to size other headgear, just to name a few examples. Besides clothing, measurements of an individual can be used in other applications, such as ergonomic product design, and the representation/prediction of a change in appearance that might occur with weight loss or gain, cosmetic surgery, and the like.

In still other applications, measurements may be made of inanimate objects for many other purposes, including, but not limited to: analysis of the contents of an object having an outer layer that is penetrated by the selected electromagnetic radiation, determining dimension of an object to make or select object packaging, assessing shipping costs based on object dimensions, and the like. The measurement/quantification of individuals and/or inanimate objects using the teachings of the present invention can be of a surface area and/or volume as an alternative or addition to lineal measurements.

Optionally, one or more measurement indicators can be displayed that overlay one or more body images. In one embodiment, the displayed image of a person can be adjusted to hide/conceal body features to which a privacy objection might be made. Alternatively, the rendering can include a schematic body image similar to a mannequin in appearance.

In one process, a clothed individual is nonintrusively scanned and the measurement(s), image(s), animation, and/or volumetric information of the individual's body is sent via server 63 and network 64 to a designated computer 82. From this computer 82, the measurement information can be sent via network 64 to one or more e-commerce clothing suppliers or other clothing business to electronically order clothing of the desired size.

Additionally or alternatively, in still other embodiments, one or more two-dimensional image data sets are rendered. Such images may be rendered from the topographical data of operation 162, and/or any of the data resulting from subsequent processing. In one form, volumetric data for body B is generated by performing a two-dimensional parallel ray projection from a desired viewing angle. Along each parallel ray, the intensity is attenuated in proportion to the data it encounters in the volumetric representation. After attenuation, the maximum voxel intensity is selected to represent an image pixel intensity for the corresponding ray. The attenuation factor is adjusted so that the back surface of the representation does not contribute to the rendering. Generally, the result is a two-dimensional map of image pixel intensity for each selected viewing angle.

Besides intensity mapping, other characteristics of the interrogated subject can be mapped. For instance, the range from the interrogating array 36 to a selected region of a subject can be used to generate a characteristic image map. In one implementation, range can be used to generate a map of relative depth of the reflecting surface of the interrogated subject with respect to designated reference locations. Specifically, range (depth) can be determined from differences in the temporal delay between transmission and detection of returned electromagnetic energy. In one particular form, a "pixelated" image map of depth is provided from such range information with the reference locations ("depth pixels") being the same as the locations of the maximum intensity pixels for the intensity-based image map.

The two-dimensional image (map) data sets can each be used to display a corresponding image with device(s) 52 as appropriate. When multiple two-dimensional images are rendered, they can optionally be presented in a selected sequence to provide an animation of body B. In one form, a sequence of about 32 to about 64 generally evenly spaced views about axis R are used to generate a rotating animation of body B about axis R. In other embodiments, data representative of one or more two-dimensional images/maps may be determined without the intermediate formation of a topographic representation. Systems utilizing a planar form of array to scan a subject are particularly suited to direct generation of two-dimensional image/map data, such as the system described, for instance, in connection with FIGS. 21 and 22. In still other embodiments, image display may only be partially shown, schematically registered, and/or dependent on the detection of a suspicious object as is more fully described next.

In other alternative embodiments, a determination is made whether the person is carrying one or more objects of interest, such as those that may pose a threat to security. These objects may be completely or partially concealed by clothing of person 22. For example, referring to FIG. 1, clothing items 24a and 24b conceal object 25 shown in the form of a weapon in phantom. In one form, the determination is initially performed by inspection of one or more rendered images. Alternatively or additionally, numerical processing of image data is performed to determine if one or more suspicious objects are being carried by person 22, such as concealed object 25 shown in FIG. 1. Nonlimiting examples of such numerical techniques are further described in connection with U.S. patent application Ser. No. 10/697, 965 (previously incorporated by reference). If the presence of suspicious objects is suspected, such suspicions can be communicated to an operator.

This communication can include displaying an image of some or all of the subject associated with the suspect object. Visual and/or audible alert signals can be generated to focus the operator's attention on the person undergoing inspection and/or a corresponding image. Optionally, the suspect image features can be highlighted by a visual characteristic such as an identifying color, blinking/flashing or other intensity variation, and the like. Based on this display, an operator can determine if further inspection is warranted, if person 22 should be detained as a security risk, and the like. Additionally or alternatively, information pertaining to the classification and detection of the objects can be displayed in text or graphic form for operator consideration. As another option, different views of the person and/or suspect image regions can be displayed simultaneously. In further variations, an operator can switch between different views and/or can zoom-in or zoom-out to change relative size of an image being displayed using input device(s) 52. In still other embodiments, false alarms can be used to refine detection criteria as desired.

To hide/conceal body features to which a privacy objection might be made, the person's body can be displayed as a schematic body image, such as a silhouette, mannequin, wire-frame body, other gender-neutral representation, and/or as a visible light range photograph or video representation of the person. On such body representations, an correspondingly located overlay of any suspicious objects can be displayed for operator viewing. Alternatively or additionally, privacy concerns can be addressed by inspecting cross-sectional images taken along the height of person 22 to at least partially evaluate whether a suspicious object is potentially being carried.

To further reduce the quantity of operator inspected images that could be subject to a privacy complaint, numerical processing, such as that described in U.S. patent application Ser. No. 10/697,965 (previously incorporated by reference) can be used to initially identify which images are presented to an operator—specifically only those for which such processing has indicated the presence of a suspicious object. Accordingly, an operator only reviews images that are indicated to show one or more objects of interest, such as a weapon or contraband, and privacy concerns are at the very least reasonably reduced if not completely eliminated. In still other embodiments, display of images of the body beneath clothing may be conditionally or unconditionally acceptable, or may be altogether absent. Alternatively or additionally, the information gathered with subsystem 40 is sent via computer network 64 to one or more remote sites 80. Sites 80 can perform some or all of the data processing of procedure 120 in lieu of processor(s) 44. In one process, a clothed individual is nonintrusively scanned by portal 30 and the image information is sent via server 63 and network 70 to a designated computer 82. Alternatively or additionally, background information about a person carrying an object of interest can be accessed via server 63 and network 70. It should be understood that such security scans are typically performed for each person passing through a given security checkpoint and/or can be repeated multiple times for a given person if results appear to be ambiguous.

Referring back to system 20 of FIG. 1, transceiver 42 and processor(s) 44 include logic that can be arranged to perform the various operations, conditionals, and routines described herein, including those described in connection procedure 120 and/or variations thereof. This logic can be in the form of one or more of software programming instructions, firmware, a programmable gate array, application specific circuitry, and/or other hardwired logic/circuitry, just to name a few examples. Furthermore such logic can be in the form of one or more signals carried with memory 46, R.M.D. 48, and/or one or more parts of computer network 70. In one example, logic signals to perform one or more operations are transmitted to/from processor(s) 44 via network 70. Alternatively or additionally, programming for processor(s) 44 is transported or disseminated through R.M.D. 48 and/or one or more other storage devices. Nonlimiting examples of other systems that can implement the operations of procedure 120 include those described in connection with FIGS. 18-25 as follows. While these systems are generally described in terms of security checkpoints, additional or alternative applications include mensuration; part matching, comparison, or mating; automated clothing, prosthesis, or other equipment fitting; or the like.

Figure 18:
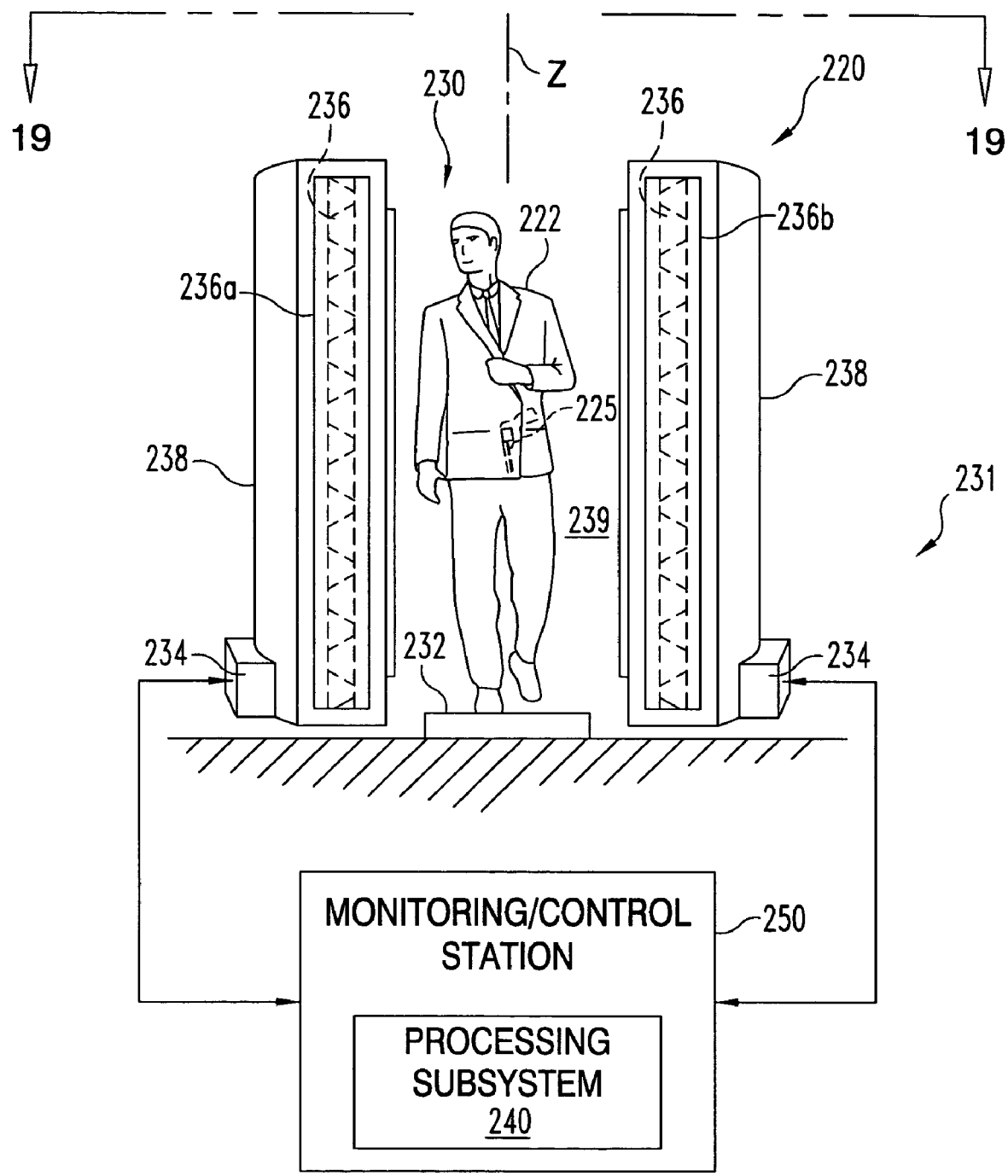
FIG. 18 is a partial, diagrammatic side view of a further system.
Figure 19:
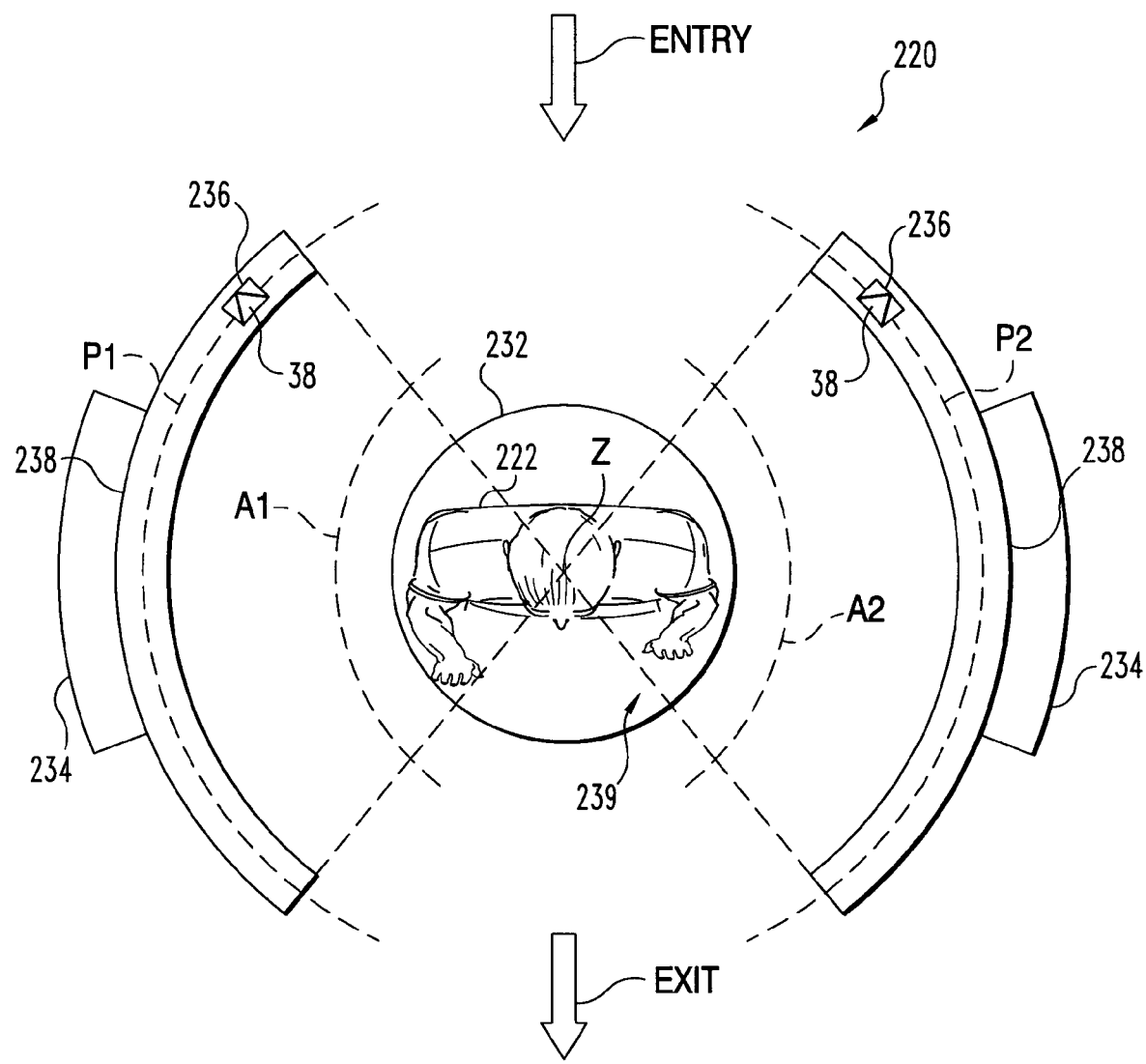
FIG. 19 is a partial, diagrammatic top view of the FIG. 18 system along the view line 19-19 shown in FIG. 18.

FIGS. 18 and 19 illustrate system 220 of a further embodiment of the present invention that can be used to perform procedure 120. System 220 illuminates person 222 with selected electromagnetic radiation in the matter described in connection with system 20. For system 220, person 222 is wearing clothing articles that conceal object 225 shown in phantom. As in the previously described embodiment of system 20, system 220 can be used to interrogate inanimate objects as well. System 220 includes dual clamshell panels 238 defining scanning portal 230 at security checkpoint 231.

System 220 also includes monitoring/control station 250 that is typically attended by one or more operators and coupled to panels 238 of portal 230. Station 250 includes processing subsystem 240. Subsystem 240 can be configured the same as subsystem 40, accounting for differences in scanning techniques of portal 230, as is more fully described hereinafter. Station 250 also includes one or more operator input and output devices (not shown) as described in connection with system 20 that are coupled to subsystem 240. Portal 230 includes stationary platform 232 arranged to support person 222. Platform 232 can be made of a material that is generally transparent to interrogation radiation. Portal 230 also includes an array 236 and a motor/drive mechanism 234 for each of panels 238. Array 236 is comprised at a column of elements 38 as described in connection with system 20. Mechanism 234 and arrays 236 are mechanically coupled to each other and are operatively coupled to subsystem 240. Under the control of subsystem 240, motor/drive mechanism 234 is configured to controllably move each of arrays 236 along a corresponding travel path P1 or P2 as best illustrated in FIG. 19. Notably, paths P1 and P2 are of a nonstraight, curvilinear type turning about axis Z. Axis Z is represented by crosshairs in FIG. 19 and corresponds to the vertical direction as best illustrated in FIG. 18. Correspondingly, arrays 236 each follow a path that turns about an interrogation region 239 including platform 232 and person 222, when driven by the respective mechanism 234. Alternatively or additionally, either or both of paths P1 and P2 could comprised of at least one straight path segment coupled to at least one other path segment in a curvilinear or angular manner. In still another arrangement, one or more of paths P1 and P2 are comprised of a number of straight path segments coupled together from one to the next at oblique angles to collectively turn about a portion of the interrogation region. In one particular form of this arrangement, the path segments are oriented to approximate an arc or other curvilinear shape. Further, while paths P1 and P2 are generally the same length and symmetric about axis Z, in other embodiments paths P1 and P2 may not be the same length and/or may not be symmetric. In one alternative variation, more than two panels, arrays, and corresponding paths are utilized.

Mechanism 234 can include an electric motor or other controlled prime mover to drive a conveying arrangement for the respective array 236. Such an arrangement could include a belt drive, a chain drive, a roller drive, or such other mechanized linkage as would occur to those skilled in the art to selectively move array 236. In other embodiments, a single prime mover may be utilized to which multiple arrays 236 in different panels are mechanically linked together to move in tandem. In further embodiments, another scanning arrangement could be utilized to transmit and/or receive the desired range of electromagnetic energy.

In system 220, subsystem 240 is configured the same of subsystem 40 of system 20, and is likewise arranged to perform procedure 120. However, the operation of subsystem 240 does not provide for interrogation completely about the circumference of person 220. Instead, interrogation is performed over a partial circumference of less the 360°. The interrogation performed corresponds to angles A1 and A2 subtended by paths P1 and P2 as followed by arrays 236. In one preferred embodiment, angles A1 and A2 are each at least 90°. In a more preferred embodiment, angles A1 and A2 are each 120° or less. In a further preferred embodiment, angles A1 and A2 collectively provide a circumference scan coverage of at least 240° about region 239. System 220 can include one or more encoders (not shown) operably coupled to system 240 and/or other devices/techniques to track position of arrays 236 relative platform 232. System 220 can further include a communication subsystem (not shown) the same as subsystem 60 to remotely communicate with subsystem 240.

In one particular arrangement, panels 238 are shaped and configured to house a respective one of arrays 236 that each are about seven feet in height, include 224 elements 38, and operate in the 10 to 20 GHz frequency range. More specifically, arrays 236 each include two subarrays of 112 elements 38 each. For each array 236, the corresponding subarray pair is arranged back-to-back. This arrangement utilizes two ultrawide transceivers, and two corresponding switching trees, one for each of arrays 236, to selectively transmit with one element 38 and receive with another element 38 in a desired sequence. A high-speed computer within subsystem 240 controls mechanisms 234, arrays 236, the tranceivers, and the switching trees to obtain topographical data for processing. Panels 238 are opposite one another to provide an angular scanning range of about 240° for this arrangement. In one mode of operating this system, a person 222 under surveillance enters along the "ENTRY" arrow into region 239 between panels 238. Person 222 then turns and faces one of panels 238 for one to two seconds while arrays 236 move along paths P1 and P2 to perform the scan. Person 222 then turns and exits along the "EXIT" arrow after scanning. It is has been found that the 240° coverage provided by this approach is suitable to detect most objects that pose a threat to security. Panels 238 are each made to be at least partially transparent to facilitate viewing therethrough by an operator during the interrogation of person 222 in region 239.

Figure 20:
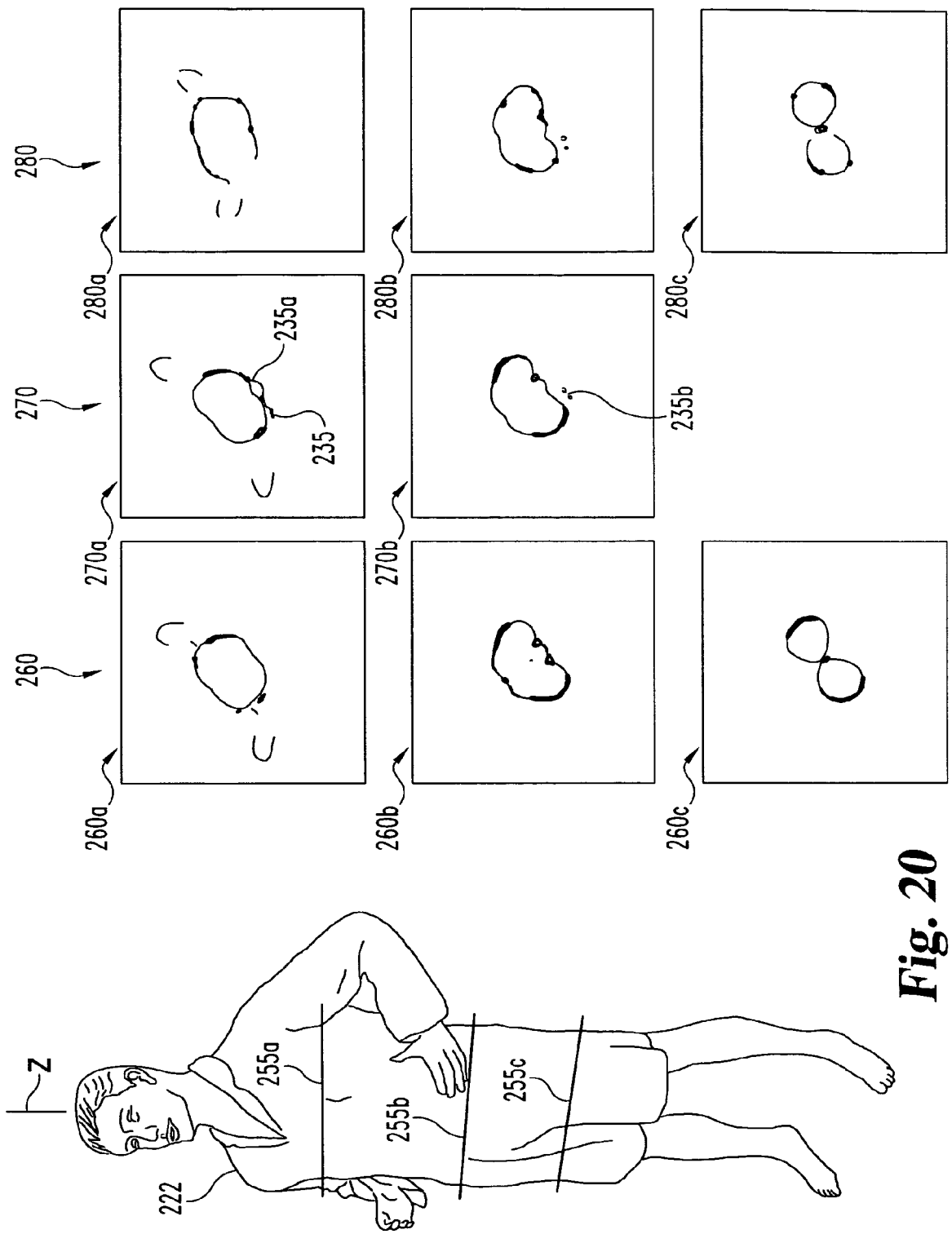
FIG. 20 is a comparative diagram illustrating cross-sectional images generated in accordance with various techniques of the present invention.

Referring to FIG. 20, cross-sectional images of mannequin 222a are shown as produced by laboratory simulation experiments performed in accordance with the present invention. Such cross-sectional images facilitate the detection of suspicious objects while reducing the likelihood of providing images to which a privacy objection might be made. Mannequin 222a is imaged in a number of views in the columns 260, 270, and 280 that were taken with respect to different section lines 255a, 255b, and 255c of mannequin 222a. Cross-sectional images 260a, 270a, and 280a correspond to sections taken along section line 255a and transverse to axis Z. Likewise, cross-sectional images 260b, 270b, and 280b correspond to sections taken along section line 255b and transverse to axis Z. Further, cross-sectional images 260c and 280c correspond to sections taken along section line 255c and transverse to axis Z. The cross-sectional images 260a, 260b, and 260c shown in column 260 each correspond to a cross-sectional view along axis Z in which there is no object being carried and in which a full, 360° circumference is imaged. Images 270a and 270b of column 270 also provide full, 360° circumference cross-sections and further depict various threats concealed by clothing. Specifically, in cross-sectional image 270a, a small handgun 235 and dielectric slab 235a are detected. In cross-sectional image 270b, hand grenade 235b is detected. Images 280a, 280b, and 280c of column 280 each depict a 240-degree partial circumference view corresponding to one arrangement of system 220. In this system, the incomplete coverage (partial circumference) still reveals hand grenade 235d. It has been found that the arrangement of system 220 with less than 360° coverage provides a faster scanning and processing time that may be desirable in certain applications.

For this particular experimental arrangement of system 220, panels 238 are operated in an FM/CW mode with a 10-20 GHz sweep in less than 20 microseconds to provide an imaging resolution of about 1 centimeter and a range resolution of about 1.5 centimeters. During operation in this manner, arrays 236 are each provided in the form of two vertically-oriented subarrays arranged back-to-back. One subarray is dedicated to transmission and the other to reception. In one form, each subarray is fabricated with 112 elements of the slot-line antenna type. For each subarray, the elements are spaced apart from one another by a uniform distance. During operation, each subarray is electronically scanned from element-to-element as the scanner moves rapidly over the generally horizontal travel path P1 or P2. As the array moves, a number of scans are performed with only one element transmitting at a time and only one receiving reflective electromagnetic radiation due to such transmission. Each transmitting element and each receiving element is activated in accordance with a desired sequence during the scan. Nonetheless, in still other embodiments, a different number, size, or type of linear array arrangement can be utilized as would occur to those skilled in the art. In still other examples, different types of rotating and/or linear scanning arrays can be utilized separately or in combination. Further, as an alternative or addition to cross-sectional images, other types of images and/or automatic concealed object detection techniques can be utilized as previously described to address privacy concerns.

Figure 21:
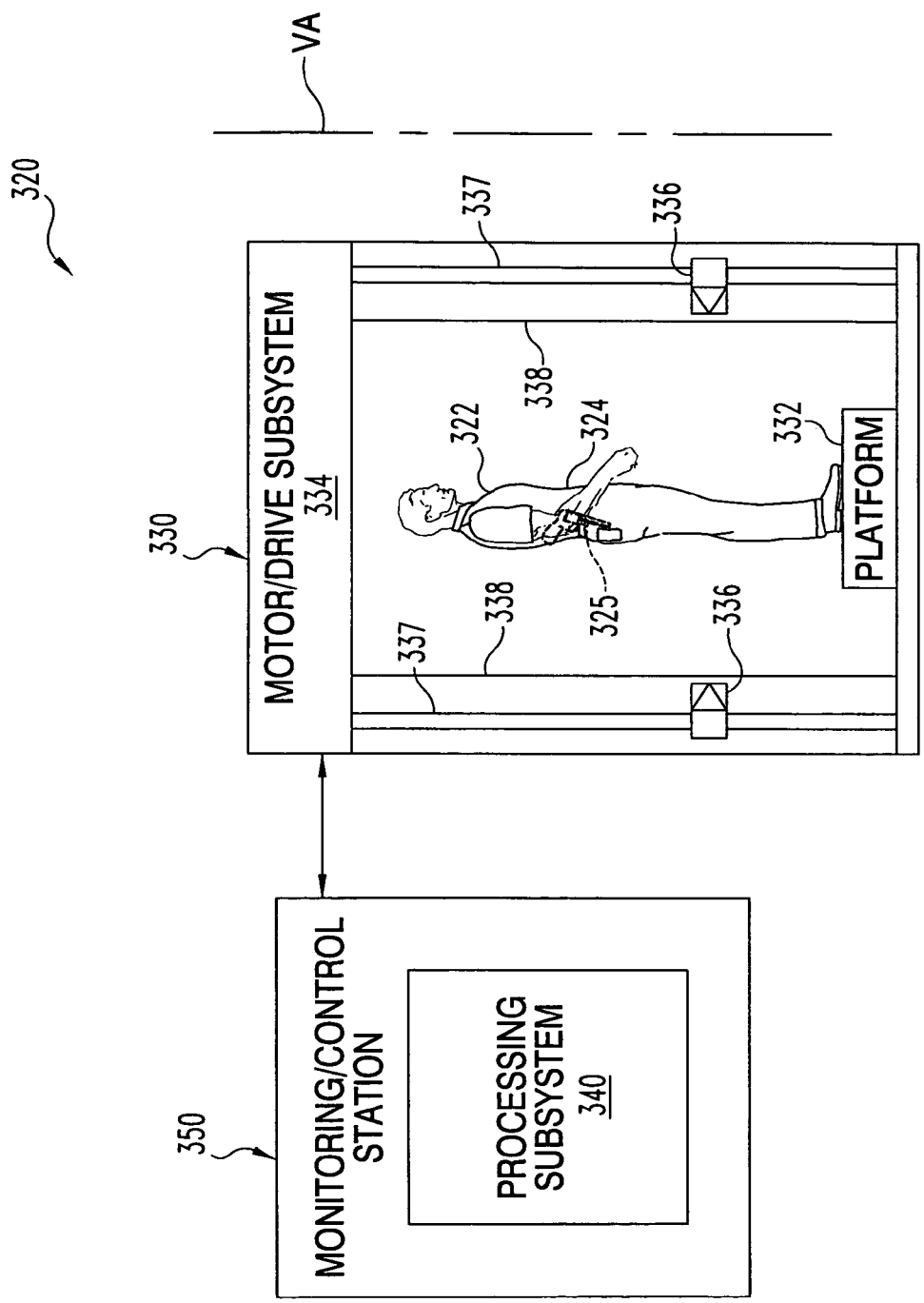
FIG. 21 is a partial, diagrammatic view of another system.
Figure 22:
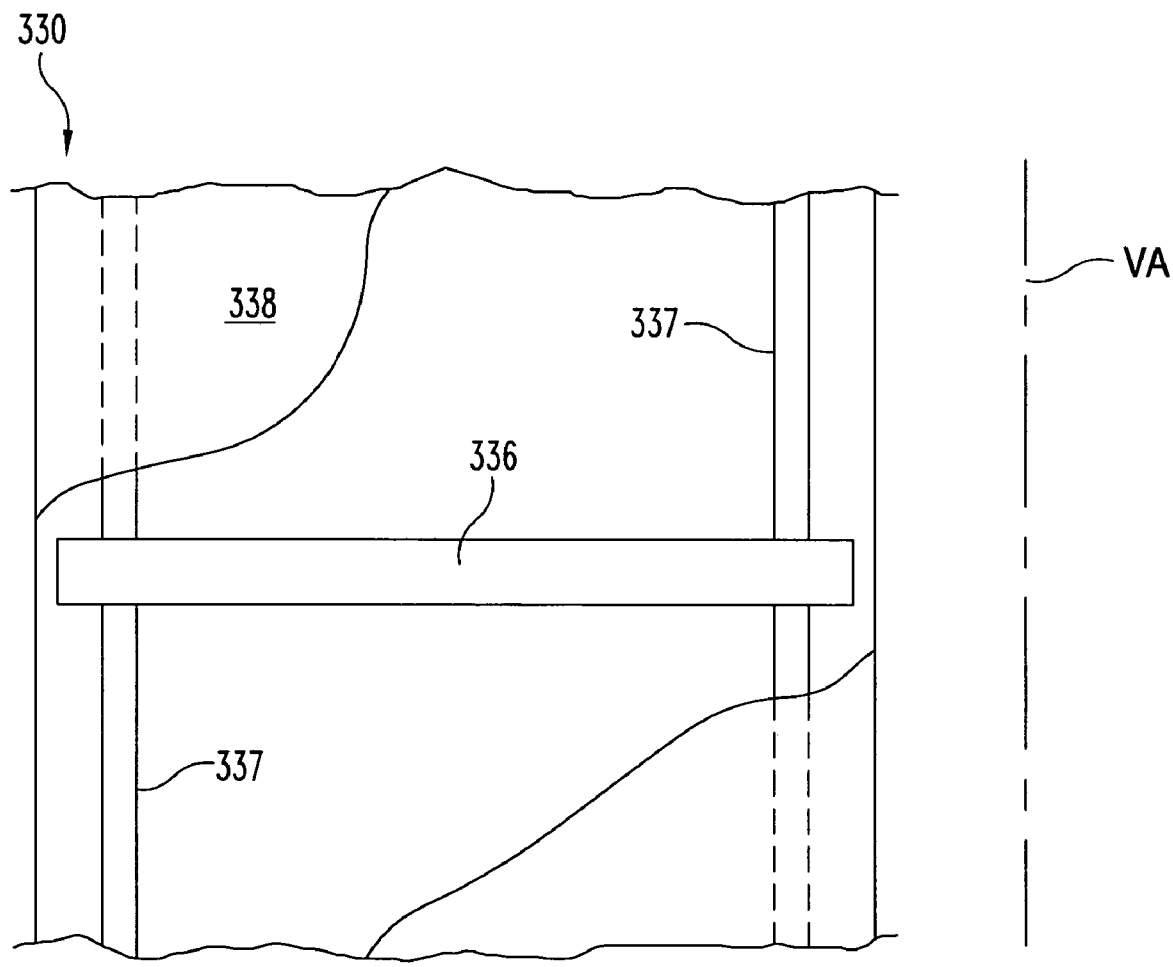
FIG. 22 is a partial, cut-away view of the portal shown in FIG. 21.

FIGS. 21 and 22 illustrate system 320 of another embodiment of the present invention that can be used to perform procedure 120. System 320 illuminates person 322 which selected electromagnetic radiation in the manner described in connection with system 20. For system 320, person 322 is wearing clothing articles that conceal object 325 shown in phantom. As in the previously described embodiments, system 320 can be used to interrogate inanimate objects as well. System 320 includes dual planar panel scanning portal 330 and processing subsystem 340 included in monitoring/control station 350. Portal 330 is coupled to processing subsystem 340 and can be configured the same as subsystem 40, accounting for differences in the scanning technique of portal 330 as is more fully described hereinafter. Station 350 includes one or more operator input and output devices as described in connection with system 20 that are coupled to subsystem 340. Station 350 can be arranged to provide a security checkpoint operator interface adjacent portal 330.

Portal 330 includes stationary platform 332 arranged to support person 322 and overhead motor/drive subsystem 334. Under the control of subsystem 340, subsystem 334 is configured to controllably slide each of two arrays 336 along corresponding guide rods 337 up-and-down with respect to vertical axis VA. Correspondingly, arrays 336 each follow a generally straight, linear path on opposite sides of person 322 and are each included within a corresponding opposing panel 338. FIG. 22 shows one of panels 338 in greater detail utilizing a partial cut-away view. In system 320, subsystem 340 is configured the same as subsystem 40 of system 20 to perform generally the same operations previously described and can include a transceiver and/or switching tree as appropriate. However, in contrast to system 20, the operation of subsystem 340 accounts for the movement of array 336 relative to person 322 in a linear, translational manner instead of a rotational manner as described in connection with system 20. System 320 can include one or more encoders (not shown) operably coupled to system 340 and/or other devices/techniques to track position of arrays 336 relative to platform 332. System 320 can further include a communication subsystem (not shown) the same as subsystem 60 to remotely communicate with subsystem 340.

In one particular arrangement, panels 338 are spaced apart by about 1.22 meters and a frequency sweep in the Ku-band from about 12.5-18 GHz is performed to provide a lateral resolution of about 1 centimeter and a depth resolution of about 2.7 centimeters. For this arrangement, arrays 336 each include two subarrays of about 56 elements each that are arranged back-to-back. One subarray is dedicated to transmission and the other subarray is dedicated to reception within each array 336. In one form, each subarray is fabricated with slot-line antennas spaced apart from one another by about 2 centimeters. During operation, each subarray is electronically scanned from element-to-element as the scanner moves rapidly over the vertical length of person 322. As the array moves, a number of scans are performed with array 336. During each scan, only one element of the transmitting subarray is illuminating the person and only one element of the receiving subarray is collecting reflected electromagnetic radiation at any given time. Accordingly, each transmitting element and each receiving element is activated in accordance with a desired sequence during the scan. In a FM/CW heterodyne transceiver configuration of this arrangement, the 5.5 GHz frequency sweep is performed in about 12.75 microseconds. In other embodiments, a different number, size, or type of linear array arrangement can be utilized as would occur to those skilled in the art. In still other examples, different types of rotating and/or linear scanning arrays can be utilized separately or in combination. Furthermore, system 320 can be used to generate one or more cross-sectional views of person 322 and/or utilize one or more other approaches previously described.

Figure 23:
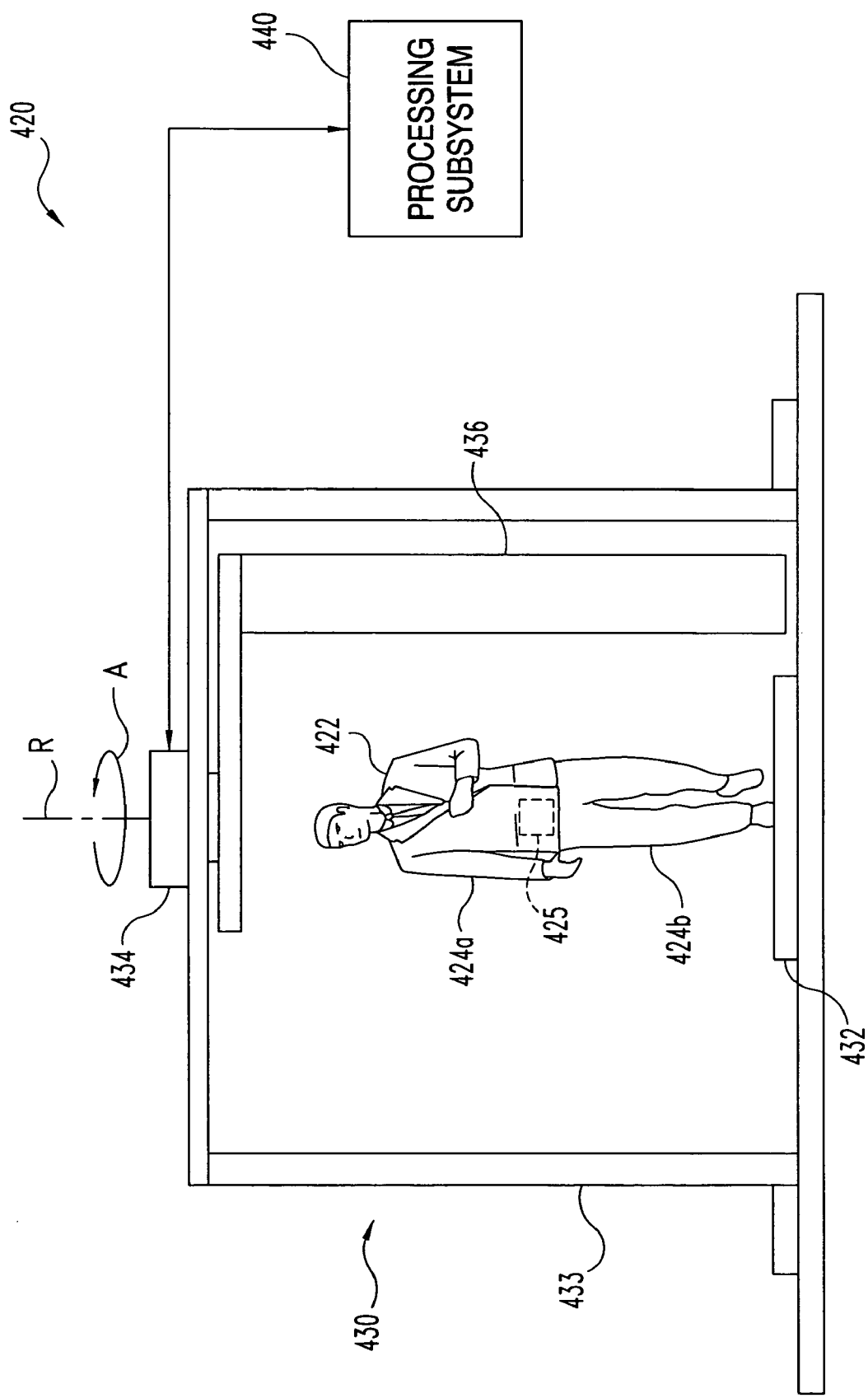
FIG. 23 is a partial, diagrammatic view of still another system.

FIG. 23 illustrates interrogation system 420 of another embodiment of the present invention. System 420 illuminates person 422 with selected electromagnetic radiation in the manner described in connection with system 20. For system 420, person 422 is wearing clothing articles 424a and 424b that hide object 425. As in previously described embodiments, system 420 can be used to interrogate inanimate objects as well.

System 420 includes scanning booth 430 coupled to control and processing subsystem 440. Scanning booth 430 includes stationary platform 432 arranged to support person 422 and frame 433 to support motor 434 coupled to array 436. In contrast to the platform rotation of portal 30 and translational movement associated with portal 330, scanning booth 430 selectively rotates array 436 about rotational axis R and platform 432 during interrogation. For this arrangement, array 436 follows a generally circular pathway to provide a corresponding imaginary cylinder about platform 432. In one form suitable for scanning a person in the standing position, the radius of this cylinder is about 1 meter. Array 436 is otherwise configured the same as array 36.

In system 420, subsystem 440 is configured the same as subsystem 40 of system 20 and is likewise arranged to perform procedure 120. However, the operation of subsystem 440 accounts for the movement of array 436 relative to platform 432 instead of the movement of platform 32 relative to array 36 as for system 20. System 420 can include one or more encoders (not shown) operatively coupled to subsystem 440 and/or other devices/techniques to track the position of array 436 relative to platform 432. System 420 can further include a communication subsystem (not shown) the same as subsystem 60 to remotely communicate with subsystem 440. System 420 can be used to generate one or more cross-sectional views of person 422 and/or utilize one or more other approaches previously described.

Figure 24:
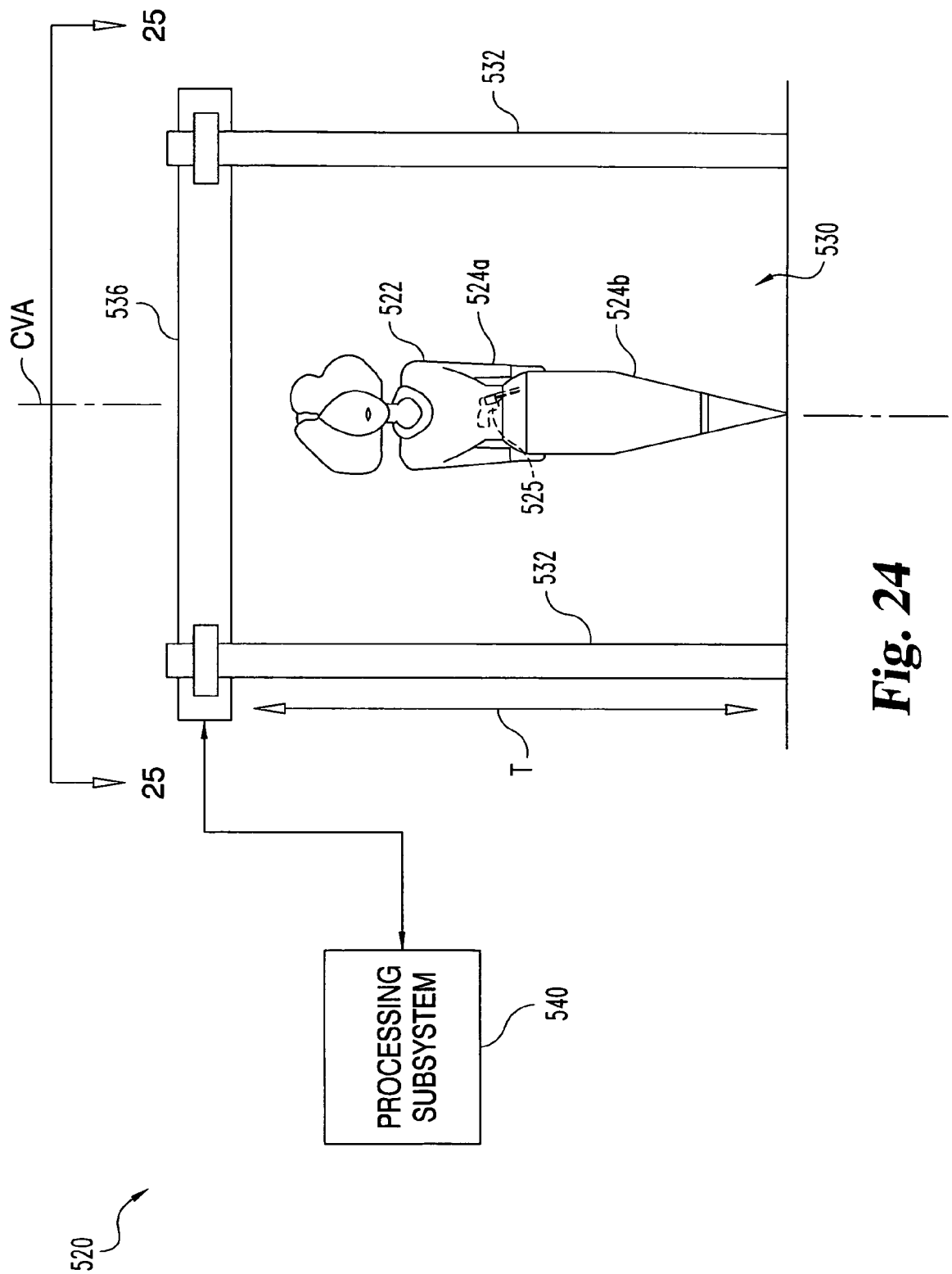
FIG. 24 is a partial, diagrammatic view of yet another system.

FIG. 24 illustrates electromagnetic radiation interrogation system 520 of yet another embodiment of the present invention. System 520 illuminates person 522 with selected electromagnetic radiation of the type previously described. For system 520, person 522 is wearing garments/clothing designated by reference numerals 524a and 524b that conceal object 525. As in previously described embodiments, system 520 can be used to interrogate animate or inanimate objects.

System 520 includes scanning booth 530 coupled to control and processing subsystem 540. Scanning booth 530 includes frame 533 arranged to receive person 522 and support array 536. In contrast to the linearly oriented arrays 36, 336, and 436 of previously described systems 20 and 420, array 536 is arranged as a ring or hoop generally centered with respect to centerline vertical axis CVA. A number of electromagnetic radiation transmitting/receiving elements are arranged in a generally circular pathway along the ring. These elements operate to interrogate person 522 with electromagnetic radiation including one or more wavelengths in the millimeter, microwave, and/or adjacent wavelength bands. Array 536 is arranged for translational movement along axis CVA to scan person 522 as represented by travel arrow T. One or more motors or other prime mover(s) (not shown) are utilized to selectively move array 536 along axis CVA.

Figure 25:
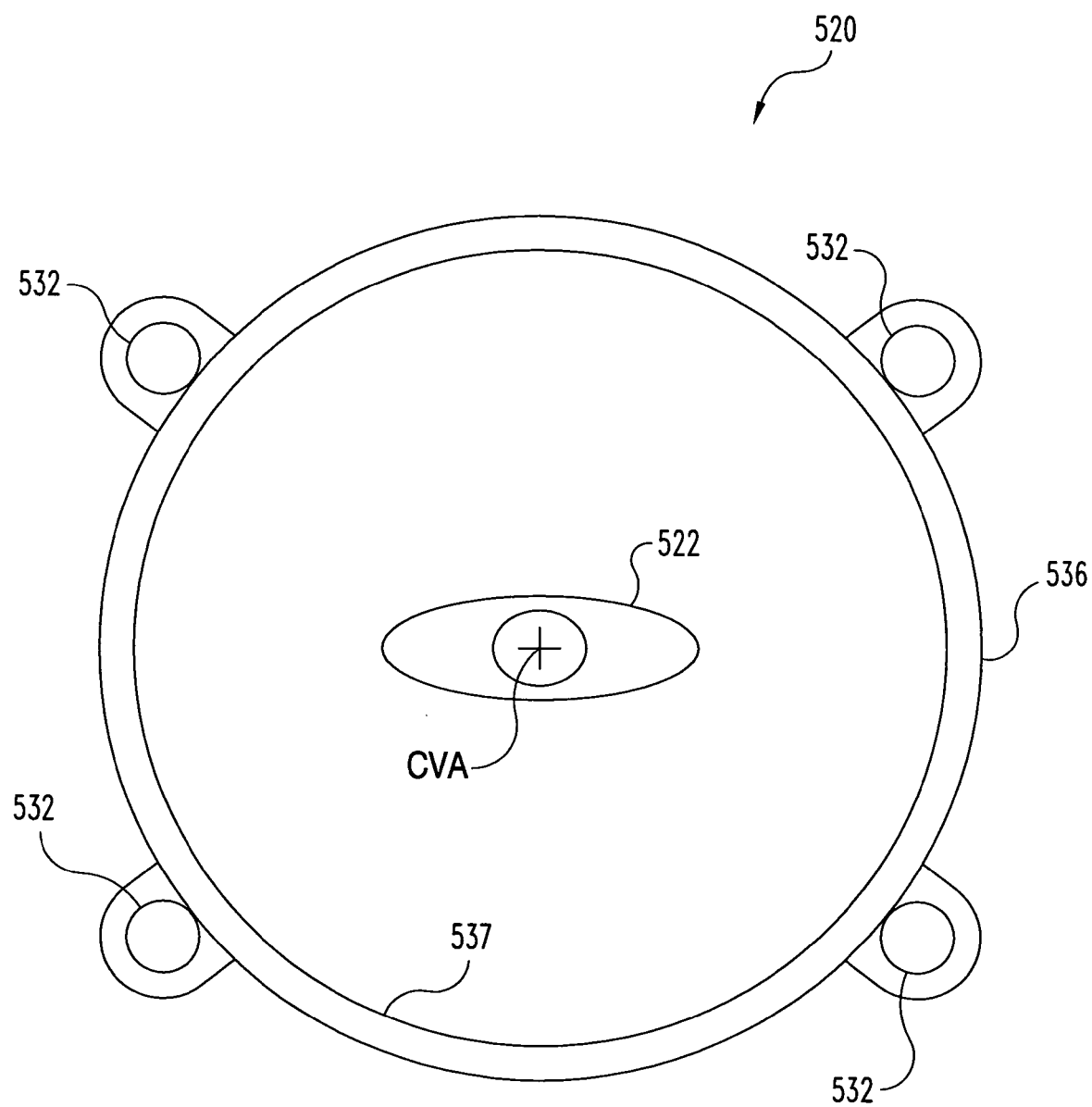
FIG. 25 is a partial, top view of the system of FIG. 24 along the view line 25-25 shown in FIG. 24.

Referring further to the partial top view of FIG. 25, array 536 is sized with opening 537 to receive person 522 therethrough as array 536 moves up and down along axis CVA. In FIG. 25, axis CVA is generally perpendicular to the view plane and is represented by crosshairs. With the vertical motion of array 536, an imaginary cylinder is defined about person 522 in accordance with the circular path defined by the array ring; however, neither person 522 nor array 536 is rotated relative to the other, instead translational movement of array 536 is used to scan person 522 vertically.

Subsystem 540 is configured the same as subsystem 40, and is operable to perform procedure 120, except that processing of subsystem 540 is adapted to account for the vertical translational movement of array 436 with its circumferential arrangement. System 520 can further include a communication subsystem (not shown) the same as subsystem 60 to remotely communicate with subsystem 540. Like previously described embodiments, system 520 is used to detect concealed objects as explained in connect with procedure 120.

Compared to array 36, a larger number of transmitting/receiving elements is typically needed for array 536 to have a comparable resolution to previously described embodiments. In one comparative nonlimiting example, between 500 and 2000 transmitting/receiving elements would be desired for array 536 versus 200 to 600 for array 36 for comparable resolution, depending on the frequency band selected. However, under appropriate conditions, scanning booth 530 can perform a scan substantially faster than portal 30. In one nonlimiting example, the scan time for portal 30 is in a range of about 10 to 20 seconds versus about 2 to 5 seconds for scanning booth 530. System 520 can be used to generate one or more cross-sectional views of person 522 and/or utilize one or more other approaches previously described.

In a further embodiment of the present invention, the body undergoing interrogation and the array both move. In one such example, array elements are arranged in an arc segment that can move vertically while the body rotates. In other examples, both the array and body rotate and/or translationally move. The processing of interrogation data can be adjusted for these different motion schemes using techniques known to those skilled in the art.

As described in connection with system 220, the interrogation and corresponding image information may not correspond to the full circumference of the body undergoing interrogation. Instead, the segment of interest can be less than 360 degrees. For such embodiments, the image information can be interpolated by combining data corresponding to two or more different view angles. Alternatively or additionally, less than the full height, width, and/or length of the subject may be scanned in other embodiments. For such alternatives, the array size and/or scanning pattern can be correspondingly adjusted.

In still other embodiments of the present invention, the data gathered with system 20, 220, 320, 420, and/or 520 corresponds to a number of cylindrical image representations without combining some or all of the representations together to provide a topographical representation. Instead, the cylindrical image datasets are used without being combined or only partially being combined. In yet other embodiments, interrogation may be completely or partially noncylindrical in nature with or without some form of combining to provide a topographical representation. In one particular case, the planar panels of system 320 may provide planar, instead of cylindrical image information without multiple frames.

In one further embodiment, information is obtained in accordance with procedure 120, system 20, system 220, system 320, system 420, and/or system 520 is additionally utilized to identify an individual. One form of this embodiment includes a technique to control access to a restricted area, comprising: scanning an individual attempting to gain access to the restricted area; determining whether the individual is concealing any objects from the scan; comparing one or more aspects of the corresponding image information regarding features of the individual to data stored for those permitted access to the restricted area; and allowing access to the restricted area by the individual if there is a favorable comparison and no suspicious concealed objects are indicated. The determination of a match can be used to activate a gate or other access control device.

In another embodiment, image information gathered in accordance with procedure 120, system 20, system 220, system 320, system 420, and/or system 520 is additionally or alternatively used to identify individuals for which access should not be permitted, such as suspected criminals, known terrorists, and the like. In one more variation of such embodiments, one or more other biometrics (such as a fingerprint, palm print, retina image, vocal pattern, etc.) of the individual are compared in addition to the topographical representation data as part of the determination of whether to allow access. The features used for identification can be changed for each access to reduce the likelihood that the access control measures will be circumvented. Alternatively or additionally, object detection in accordance with the present invention can be used to determine if an individual is taking an object from an area without permission to do so. Any of these embodiments can be provided as a method, apparatus, system, and/or device.

A further embodiment of the present invention includes: scanning a target with electromagnetic radiation including one or more frequencies in a range of about 200 MHz to about 1 THz; determining data corresponding to a topographical representation of the target from this scan, which has a varying degree of spatial uncertainty with respect to surface position of the target; and generating a point cloud representation of the surface of the target from the data. In one form, the point cloud representation includes a number of points each determined by evaluating spatial variation of the data for a different portion of the topographical representation.

Another embodiment of the present invention includes: interrogating a target with electromagnetic radiation including one or more frequencies in a range of about 200 MHz to about 1 THz; establishing spatially varying data corresponding to a three-dimensional representation of a surface of the target; selecting a two-dimensional section of the representation; and defining a number of points representative of a contour of the surface as a function of spatial variation of the data along a corresponding one of a number of reference axes extending through the section.

Still another embodiment includes: interrogating a person at least partially covered by clothing with electromagnetic radiation including one or more frequencies in a range of about 200 MHz to about 1 THz; establishing spatially varying data corresponding to a three-dimensional representation of a surface beneath the clothing based on the interrogation; selecting a cross-sectional region of the representation; and defining a number of points representative of a contour of the surface beneath the clothing as a function of spatial variation of the data along a corresponding one of a number of reference axes extending through the cross-sectional region.

Yet another embodiment of the present invention includes: scanning a person at least partially covered by clothing with electromagnetic radiation including one or more frequencies in a range of about 200 MHz to about 1 THz; establishing a point cloud representation of a surface beneath the clothing of the person from said scanning; and performing one or more curve-fitting operations as a function of at least a portion of the points to represent at least a portion of the surface beneath the clothing.

A further embodiment comprises: radiating an interrogation region including a person at least partially covered by clothing; detecting electromagnetic radiation returned from the interrogation region in response to this radiation; and rendering a surface beneath the clothing based on a skeletal vector model. In one form, the electromagnetic radiation includes one or more frequencies in a range of about 200 MHz to about 1 THz and/or the skeletal vector model includes a number of line segments corresponding to different body portions of the person.

In another embodiment, a system includes: an array to interrogate a target with electromagnetic radiation at one or more frequencies in a range of about 200 MHz to about 1 THz, a processing subsystem coupled to the array, and an output device responsive to the subsystem to provide an output based on a signal from the processing subsystem. The processing subsystem is operable to establish spatially varying data corresponding to a three-dimensional representation of a surface of the target generated in response to interrogation of the target with the array. The processing subsystem is further operable to evaluate a cross-sectional region of the representation and define a number of points representative of a contour of the surface of the target as a function of spatial variation of the data. These points each correspond to one of a number of reference axes extending along the cross-sectional region. In one form, a person at least partially covered by clothing is interrogated and the three-dimensional representation at least partially corresponds to a surface beneath the clothing. For such form, the contour corresponds to a surface at least partly beneath the clothing. Alternatively or additionally, the output device provides the output in the form of a measurement of at least a portion of the contour.

For yet another embodiment, an apparatus includes a device carrying logic executable by one or more processors to control scanning of a target with electromagnetic radiation including one or more frequencies in a range of about 200 MHz to about 1 THz and establish data corresponding to a topographical representation of the target based on such scanning. The topographical representation has a varying range of spatial uncertainty with respect to a position of the surface of the target. The logic is further executable to generate a point cloud representation of the surface of the target from the data by performing an evaluation of each of a number of subsets of the data. In one form, these subsets each correspond to one of a number of different two-dimensional regions of the target. For each of the subsets, the logic is executable to determine a point of the point cloud representation as a function of one or more reference axes extending along a representative one of the two-dimensional regions and a measurement of the electromagnetic radiation returned by the target along the one or more reference axes in response to the scanning.

All publications and patent applications cited in this specification are herein incorporated by reference as if each individual publication or patent application were specifically and individually indicated to be incorporated by reference. Further, any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected.

What is claimed is:

1. A method, comprising:
    interrogating a person at least partially covered by clothing with electromagnetic radiation including one or more frequencies in a range of about 200 MHz to about 1 THz;
    establishing spatially varying data corresponding to a three-dimensional representation of a surface beneath the clothing based on said interrogating;
    selecting a cross-sectional region of the representation; and
    defining a number of points representative of a contour of the surface beneath the clothing as a function of spatial variation of the data along a corresponding one of a number of reference axes extending through the cross-sectional region.

2. The method of claim 1, wherein the cross-sectional region corresponds to a sectional plane, the reference axes each correspond to a line segment coplanar with the sectional plane, and at least a portion of the reference axes are approximately parallel to one another.

3. The method of claim 1, wherein the cross-sectional region corresponds to a sectional plane, the reference axes each correspond to a radial line segment extending from an origin and coplanar to the sectional plane, and the contour at least partially surrounds the origin.

4. The method of claim 3, wherein the origin is coincident with a line segment of a skeletal vector model.

5. The method of claim 1, further comprising performing a curve-fitting operation to define the contour.

6. The method of claim 5, further comprising determining a dimension of the contour.

7. The method of claim 5, wherein the curve-fitting operation includes elliptical curve fitting.

8. The method of claim 7, further comprising performing Fourier boundary fitting.

9. The method of claim 1, wherein said establishing includes combining a number of data sets, the data sets each corresponding to a different cylindrical image of the person from a different view.

10. A method, comprising:
    scanning a person at least partially covered by clothing with electromagnetic radiation including one or more frequencies in a range of about 200 MHz to about 1 THz;
    establishing a point cloud representation of a surface beneath the clothing of the person from said scanning; and
    performing one or more curve-fitting operations as a function of at least a portion of the points of the point cloud representation to represent at least a portion of the surface beneath the clothing.

11. The method of claim 10, wherein the one or more curve-fitting operations includes elliptical curve fitting.

12. The method of claim 10, wherein the one or more curve-fitting operations includes Fourier boundary fitting.

13. The method of claim 10, wherein said performing includes defining a number of contours of the surface and determining a dimension of each of the contours.

14. A method, comprising:
    scanning a target with electromagnetic radiation including one or more frequencies in a range of about 200 MHz to about 1 THz;
    from said scanning, determining data corresponding to a topographical representation of the target, the topographical representation having a varying degree of spatial uncertainty with respect to position of a surface of the target; and
    generating a three-dimensional point cloud representation of the surface of the target from the data, the point cloud representation including a number of points each determined by evaluating spatial variation of the data for a different portion of the topographical representation.

15. The method of claim 14, wherein the target is a person in an interrogation area and at least a portion of the surface represented by the point cloud representation corresponds to skin of the person beneath clothing.

16. The method of claim 14, which includes defining a number of contours of the surface by performing one or more curve-fitting operations.

17. A method, comprising:
    irradiating an interrogation region including a person at least partially covered by clothing;
    detecting electromagnetic radiation returned from the interrogation region in response to said irradiating, the electromagnetic radiation including one or more frequencies in a range of about 200 MHz to about 1 THz; and
    rendering a surface beneath the clothing based on a skeletal vector model, the skeletal vector model including a number of line segments corresponding to different body portions of the person.

18. The method of claim 17, wherein said rendering includes determining a point cloud representation of the surface as a function of the skeletal vector model and a number of reference axes.

19. The method of claim 18, wherein said rendering includes determining a number of contours of the surface by performing one or more curve fitting operations, the curve fitting operations including at least one of elliptical curve fitting and Fourier boundary fitting.

20. The method of claim 17, wherein said rendering includes:
    evaluating a sectional region selected relative to one of the line segments of the skeletal vector model;

determining each of a number of points representative of the surface from a different reference axis and the electromagnetic radiation returned from the interrogation region along the different reference axis; and defining a surface contour for the sectional region from the number of points.

21. The method of claim 20, wherein the sectional region, the number of points, and the reference axis are coplanar.

22. The method of claim 17, wherein the line segments include one or more corresponding to each arm of the person, one or more corresponding to each leg of the person, and one or more corresponding to a trunk of the person.

23. A system, comprising:

an array operable to interrogate a person at least partially covered by clothing with electromagnetic radiation at one or more frequencies in a range of about 200 MHz to about 1 THz;

a processing subsystem coupled to the array, the processing subsystem being operable to establish spatially varying data corresponding to a three-dimensional representation of a surface beneath the clothing based on data generated in response to interrogation of the person with the array, the processing subsystem being further operable to evaluate a cross-sectional region of the representation and define a number of points representative of a contour of the surface beneath the clothing as a function of spatial variation of the data, the points each corresponding to one of a number of reference axes extending along the cross-sectional region; and an output device responsive to the processing subsystem to provide an output at least partially based on the contour.

24. The system of claim 23, further comprising means for performing one or more curve-fitting operations to define the contour.

25. The system of claim 23, wherein the output device is operable to provide at least one dimension of the contour.

26. The system of claim 23, wherein the processing subsystem is further operable to determine a plurality of different surface contours and provide a measurement of each of the different surface contours based on the interrogation with the array.

27. The system of claim 26, wherein the processing subsystem further comprises means for determining each of the different surface contours as a function of a point cloud representation of the surface including the number of points and a skeletal vector model.

28. The system of claim 23, wherein the array is one of two arrays, the arrays each being arranged in a different one of two respective panels positioned opposite each other.

29. The system of claim 23, further comprising means for moving at least one of the array and the person relative to another.

30. The system of claim 23, wherein the moving means rotates the at least one of the array and the person.

31. An apparatus, comprising: a device carrying logic executable by one or more processors operable to control scanning of a target with electromagnetic radiation including one or more frequencies in a range of about 200 MHz to about 1 THz and establish data corresponding to a topographical representation of the target based on the scanning of the target, the topographical representation having a varying range of spatial uncertainty with respect to position of a surface of the target;

the logic being further executable to generate a point cloud representation of the surface of the target from the data by performing an evaluation of each of a number of subsets of the data, the subsets each corresponding to one of a number of different two-dimensional regions of the target; and for each of the subsets, the logic being executable to determine a point of the point cloud representation of the surface as a function of one or more reference axes extending along a respective one of the two-dimensional regions and a measurement of electromagnetic radiation returned by the target along the one or more reference axes in response to the scanning.

32. The apparatus of claim 31, wherein the device is in the form of a processor-readable memory and the logic is in the form of a number of instructions stored in the memory.

33. The apparatus of claim 31, wherein the device includes one or more parts of a computer network and the logic is encoded in one or more signals for transmission over the computer network.

34. A method, comprising:

scanning a person at least partially covered by clothing with electromagnetic radiation including one or more frequencies in a range of about 200 MHz to about 1 THz;

establishing a point cloud representation of a surface beneath the clothing of the person from said scanning, wherein said establishing includes:

generating data representative of a topographical image of the person from electromagnetic radiation returned by said scanning, evaluating subsets of the data, the subsets each corresponding to one of a number of different two-dimensional cross sections of the person, the subsets each including a varying degree of uncertainty with respect to position of the surface, and for each of the subsets, determining a point of the point cloud representation of the surface as a function of the electromagnetic radiation returned relative to a different one of a number of reference axes; and performing one or more curve-fitting operations as a function of at least a portion of the points of the point cloud representation to represent at least a portion of the surface beneath the clothing.

35. A method, comprising:

scanning a person at least partially covered by clothing with electromagnetic radiation including one or more frequencies in a range of about 200 MHz to about 1 THz;

establishing a point cloud representation of a surface beneath the clothing of the person from said scanning;

performing one or more curve-fitting operations as a function of at least a portion of the points of the point cloud representation to represent at least a portion of the surface beneath the clothing, wherein said performing includes defining a number of contours of the surface and determining a dimension of each of the contours and one or more curve fitting operations include elliptical curve fitting and Fourier boundary fitting; and determining a number of contours corresponding to a skeletal vector model.

36. A method, comprising:

scanning a target with electromagnetic radiation including one or more frequencies in a range of about 200 MHz to about 1 THz;

from said scanning, determining data corresponding to a topographical representation of the target, the topographical representation having a varying degree of spatial uncertainty with respect to position of a surface of the target;

generating a three-dimensional point cloud representation of the surface of the target from the data, the point cloud representation including a number of points each determined by evaluating spatial variation of the data for a different portion of the topographical representation, wherein said generating includes:

evaluating subsets of the data, the subsets each corresponding to one of a number of different two-dimensional sections of the target, and for each of the subsets, determining one of the points of the point cloud representation of the surface as a function of one or more reference axes extending along a respective one of the two-dimensional sections and electromagnetic radiation returned by the target along the one or more reference axes in response to said scanning.

37. The method of claim 36, further comprising generating the data from the electromagnetic radiation returned by the target from each of a number of views, the data for each of the views corresponding to a cylindrical image of the target.

38. A method, comprising:

scanning a person at least partially covered by clothing with electromagnetic radiation including one or more frequencies in a range of about 200 MHz to about 1 THz;

establishing a point cloud representation of a surface beneath the clothing of the person from said scanning;

performing one or more curve-fitting operations as a function of at least a portion of the points of the point cloud representation to represent at least a portion of the surface beneath the clothing, wherein said performing includes defining a number of contours of the surface and determining a dimension of each of the contours, and the one or more curve fitting operations include at least one of elliptical curve fitting and Fourier boundary fitting; and determining the contours in correspondence to one or more of a number of line segments of a skeletal vector model.

* * * * *